(12) United States Patent  
Oyabu

(10) Patent No.: US 7,443,628 B2  
(45) Date of Patent: Oct. 28, 2008

(54) STORAGE APPARATUS, SPINDLE MOTOR CONTROL METHOD, AND PROGRAM

(75) Inventor: Hiroshi Oyabu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 11/435,190

(22) Filed: May 16, 2006

(65) Prior Publication Data

US 2007/0183282 A1   Aug. 9, 2007

(30) Foreign Application Priority Data

Feb. 3, 2006   (JP) .............................. 2006-026619

(51) Int. Cl.
*G11B 15/18* (2006.01)
*G11B 17/00* (2006.01)

(52) U.S. Cl. ......................... 360/71; 360/69; 369/47.38

(58) Field of Classification Search ........................ None
See application file for complete search history.

(56) References Cited

U.S. PATENT DOCUMENTS 5,508,987 A * 4/1996 Matsunaga et al. ....... 369/53.22
2007/0076549 A1 * 4/2007 Morishige ................ 369/47.39

FOREIGN PATENT DOCUMENTS

JP   9-198820   7/1997
JP   2005-135546   5/2005

* cited by examiner

*Primary Examiner*—Jason C Olson
(74) *Attorney, Agent, or Firm*—Greer, Burns & Crain, Ltd.

(57) ABSTRACT

A default gain table stores values of loop gain of a spindle motor control unit predetermined for each number of media. A loop gain setting unit detects the number of media, reads out a loop gain corresponding to the detected number of media from the default gain table and sets it in the spindle motor control unit. A loop gain measuring unit measures the loop gain of the spindle motor control unit during a test in the manufacturing process, adjusts it into an optimum loop gain, and stores it as a default lop gain in the apparatus.

20 Claims, 21 Drawing Sheets

FIG. 3

| NUMBER OF MEDIA | LOOP GAIN |
|---|---|
| 1 | G1 |
| 2 | G2 |

| NUMBER OF MEDIA | SOURCE VOLTAGE (V) | TEMPERATURE (°C) | LOOP GAIN |
|---|---|---|---|
| 1 | 4.5 | 00 | G111 |
| | | 25 | G112 |
| | | 60 | G113 |
| | 5.0 | 00 | G121 |
| | | 25 | G122 |
| | | 60 | G123 |
| | 5.5 | 00 | G131 |
| | | 25 | G132 |
| | | 60 | G133 |
| 2 | 4.5 | 00 | G211 |
| | | 25 | G212 |
| | | 60 | G213 |
| | 5.0 | 00 | G221 |
| | | 25 | G222 |
| | | 60 | G223 |
| | 5.5 | 00 | G231 |
| | | 25 | G232 |
| | | 60 | G233 |

STORAGE APPARATUS, SPINDLE MOTOR CONTROL METHOD, AND PROGRAM

This application is a priority based on prior application No. JP 2006-026619 filed Feb. 3, 2006, in Japan

BACKGROUND OF THE INVENTION

1. Field of the Invention

The present invention relates to a storage apparatus which reads and writes information from and into a medium rotated by a spindle motor, a spindle motor control method and a program. More particularly, the invention relates to a storage apparatus which controls a loop gain to an optimum value for servo-controlling a spindle motor so as to ensure rotation of a medium at a constant speed, a spindle motor control method and a program.

2. Description of the Related Art

In a storage apparatus such as a magnetic disk apparatus, a brushless DC motor as conventionally been used as a spindle motor rotating a recording medium at a constant speed, and it has been the conventional practice to set a target rotational speed by a spindle motor control unit, detect revolutions of the brushless DC motor from the counter electromotive force of the stator coil, and driving current of each phase to the spindle motor is servo-controlled so as to eliminate a difference from a target revolutions by feeding back the result of detection.

The duty ratio of driving current fed to each phase of the motor is controlled so as to eliminate the difference in speed, and noise is reduced by expressing the peak change in switching current waveform caused by the control of duty ratio in a sine wave.

More recently, the field of application of the magnetic disk apparatus has expanded, not limited to desktop type and note type personal computers, but also to car navigation systems and AV devices. For the purpose of enhancing the mass-producibility and reducing cost, apparatuses in which only the number of media is different and all other components including an enclosure, disk enclosure, circuit board and firmware are made common are now being manufactured.

Usually, when designing spindle motor control units used for apparatuses of different numbers of media, the fact should be taken into account that the difference in the number of media leads to a difference in inertia of the spindle motors. It is therefore the common practice to determine a loop gain of the servo loop so that control properties of the spindle motor is not affected by variations of this inertia, and to make it possible to accomplish common control irrespective of the number of media.

There is available a related patent document JP 9-198820.

In such a conventional spindle motor control unit for coping with apparatuses of different numbers of media, a servo gain is determined so as to cover variations of inertia resulting from the difference in the number of media. However, as compared with a case of optimization of the loop gain of the spindle motor control unit with a fixed number of media, stability against disturbance such as temperature and source voltage is not perfect.

For example, when there is a change in environmental temperature of the apparatus, the magnet intensity in the spindle motor changes under the effect of temperature, and furthermore, particularly when using a fluid bearing, variation of the oil viscosity leads to a change in the loop gain of the servo loop. As a result, a problem is encountered in that a desired control property cannot be maintained for the spindle motor under a temperature condition within a range of service temperatures, for example, from 0° C. to 60° C.

When a change in source voltage occurs, PWM control of motor current may cause a change in loop gain under the effect of voltage variation. PWM control of motor current causes a change in duty ratio so as to eliminate the difference in speed. Since a lower source voltage corresponds to a decrease in current and hence in speed, leading to a larger difference in speed, thus causing an increase in duty ratio. This change in duty ratio causes a change in loop gain and sometimes prevents a desired control property from being kept.

In an actual apparatus, changes in temperature and changes in source voltage compositely occur. It is therefore difficult to maintain the spindle motor with desired control properties in all possible environments relative to changes in the number of media.

SUMMARY OF THE INVENTION

It is an object of the present invention to provide a storage apparatus which makes it possible, even in apparatuses having different numbers of media, to maintain desired control properties under a wide range of service conditions by the use of a common spindle motor, a spindle motor control method and a program.

(Storage Apparatus)

According to the present invention, there is provided a storage apparatus having a spindle motor control unit which servo-controls a spindle motor so as to maintain a medium at certain revolutions, comprising:

a loop gain storing unit which stores a loop gain of the spindle motor control unit predetermined for each medium; and a loop gain setting unit which detects the number of the media, reads out a loop gain corresponding to the detected number of media from the loop gain storing unit and sends it in the spindle motor control unit.

In the above-mentioned storage apparatus, the loop gain setting unit detects the number of head connections to a head control circuit, and detects the number of media from the detected number of head connections. For example, the loop gain setting unit measures resistance by supplying sense current while sequentially selecting head connecting terminals of the head control circuit, and when the measured resistance is lower than a prescribed value, the presence of head connection is determined and the number of head connections is detected.

Also in the above-mentioned memory device, the loop gain storing unit is a nonvolatile memory storing a default gain table which stores loop gains measured in advance for each number of media.

The storage apparatus of the present invention further comprises a loop gain measuring unit which measures a loop gain of the spindle motor control unit and adjusts it to an optimum loop gain; wherein the loop gain setting unit reads out a loop gain corresponding to a number of media, upon activation along with the first power-on, from the default gain table to set it in the spindle motor control unit, then adjusts the spindle motor control unit by the loop gain measuring unit to an optimum loop gain, stores the optimum loop gain in a system area of the medium, and upon activation along with the second and subsequent power-on of power, reads out the optimum loop gain from the system area of the medium to set it in the spindle motor control unit.

The loop gain measuring unit measures a response signal obtained after application of a disturbance signal to the output signal of the spindle motor control unit, and adjusts the loop gain to an optimum value so that the response signal agrees with the disturbance signal.

The loop gain storing unit is a nonvolatile memory which stores, in addition to the number of media, temperatures within a range of used temperatures, and a default gain table storing loop gains of the spindle motor control unit predetermined for each voltage within a range of allowable source voltages; and the loop gain setting unit reads out a loop gain corresponding to a temperature and a source voltage detected upon activation of the device along with power-on from the default gain table, and sets it in the spindle motor control unit.

When the loop gain setting unit detects a change in temperature or source voltage over a prescribed value, it reads out a loop gain corresponding to temperature or source voltage after change from the default gain table and sets it in the spindle motor control unit.

When the storage apparatus is provided with a loop gain measuring unit which measures loop gain of the spindle motor control unit and adjusts it to an optimum loop gain, the loop gain setting unit reads out, upon activation along with the first power-on, a loop gain corresponding to the number of media, temperature and source voltage from the default gain table, and sets it in the spindle motor control unit; adjusts the spindle motor control unit to an optimum loop gain by means of the loop gain measuring unit; stores the optimum loop gain in the system area of the medium; and upon activation along with the second and subsequent power-on, reads out the optimum loop gain from the system area of the medium, and sets it in the spindle motor control unit.

(Method)

According to the present invention, there is also provided a spindle motor control method of a memory device comprising:

a spindle motor controlling step of servo-controlling a spindle motor so as to keep a medium at constant revolutions;

a loop gain storing step of storing the loop gain of the spindle motor controlling step predetermined for each number of media; and a loop gain setting step of detecting the number of the media, reading out a loop gain corresponding to the detected number of media from the loop gain storing step, and setting it to the spindle motor controlling step.

(Control Apparatus)

According to the present invention, there is provided a a spindle motor control apparatus which servo-controls a spindle motor so as to maintain a medium at certain revolutions, comprising:

a loop gain storing unit which stores a loop gain of the spindle motor control unit predetermined for each medium; and a loop gain setting unit which detects the number of the media, reads out a loop gain corresponding to the detected number of media from the loop gain storing unit and sends it in the spindle motor control apparatus.

(Program)

According to the present invention, there is also provided a program executed by a computer of a memory device having a spindle motor control unit servo-controlling a spindle motor so as to keep a medium at constant revolutions.

The spindle motor controlling program of the present invention causes a computer of a storage apparatus to execute:

a loop gain storing step for storing the loop gain of the spindle motor controlling step predetermined for each medium; and a loop gain setting step for detecting the number of the media, reading out a loop gain corresponding to the detected number of media from the loop gain storing step, and setting it in the spindle motor controlling step.

For storage apparatuses with different numbers of media, it has been the conventional practice to set an optimum loop gain corresponding to the number of media and determine it so as to cover different numbers of media by measuring a loop gain of the spindle motor control unit for achieving desired control properties for each number of media and statistically determine it in advance, storing the thus determined loop gains as default loop gains in a table, automatically detecting the number of media upon activating the apparatus along with power-on, and reading out a loop gain corresponding to the number of media from the table to set it in the spindle motor control unit. As compared with the conventional loop gain, the present invention makes it possible to set an optimum loop gain suitable for an actual number of media, and hence, to more reliably maintain desired control properties against a wide range of temperature change and source voltage variation.

Setting of statistically determined default loop gain is changed into an optimum loop gain intrinsic to the apparatus by measuring actual loop gain by means of the loop gain measuring unit of the apparatus itself after setting a default loop gain corresponding to the number of media as derived from the table, adjusting it to an optimum loop gain and setting it. This permits reliable maintenance of control performance of a desired spindle motor against a temperature change or a source voltage variation.

In addition to the number of media, default loop gains are measured through in-process tests and statistically determined in advance for each temperature within a range of service temperatures and for each voltage within a range of source voltage variations, and the result is stored in a table. By the use of this table, upon activation of the apparatus, a loop gain corresponding to the then temperature and source voltage is set in addition to the number of media, and it is possible to maintain more reliably the control performance of a desired spindle motor against a wide range of temperature change or source voltage variation.

The above and other objects, features, and advantages of the present invention will become more apparent from the following detailed description with reference to the drawings.

BRIEF DESCRIPTION OF THE DRAWINGS

FIG. 3 is a descriptive view of the default gain table shown in FIG. 1;

FIG. 16 is a descriptive view of the default gain table shown in FIG. 15;

DETAILED DESCRIPTION OF THE PREFERRED EMBODIMENTS

Figure 1:
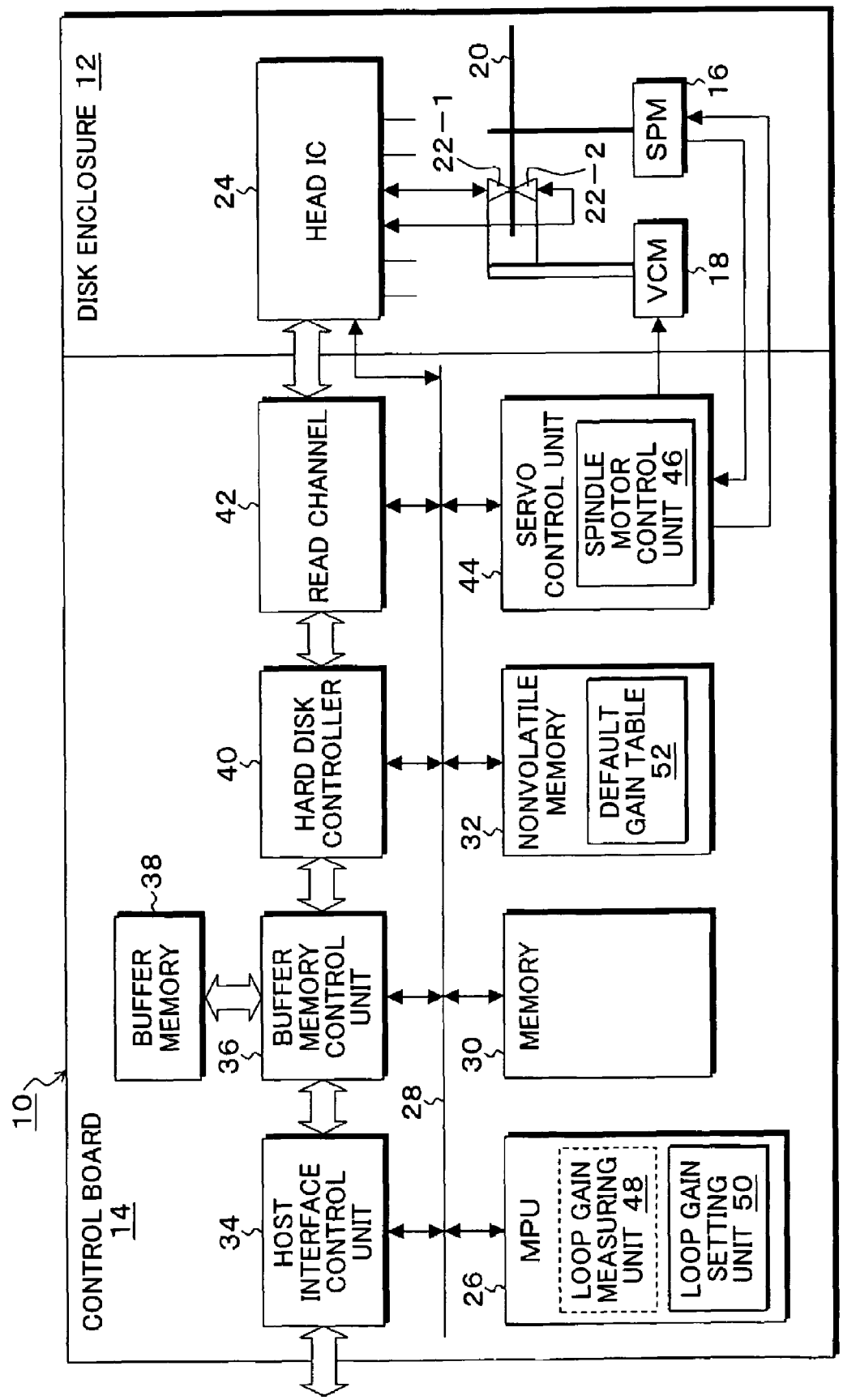
FIG. 1 is a block diagram when applying the present invention to a magnetic disk device having a single medium.

FIG. 1 is a block diagram in a case where the present invention is applied to a magnetic disk apparatus of a single mounted disk medium. In FIG. 1, a magnetic disk apparatus 10 known as a hard disk drive (HDD) is composed of a disk enclosure 12 and a control board 14. A spindle motor 16 is provided in the disk enclosure 12. A magnetic disk medium 20 is attached to a rotation shaft of the spindle motor 16 and is rotated at a constant rotating speed of, for example, 5,400 rpm. A 3-phase brushless DC motor is used as a spindle motor 16. In this embodiment, a single magnetic disk medium 20 is mounted on the rotation shaft of the spindle motor 16. Since a magnetic disk medium has recording faces on two sides, heads 22-1 and 22-2 are arranged. A voice coil motor 18 is provided in the disk enclosure 12. The voice coil motor 18 has heads 22-1 and 22-2 mounted on an arm tip of a head actuator for positioning of the heads relative to the recording faces of the magnetic disk medium 20. The heads 22-1 and 22-2 have a write head and a read head mounted integrally. The heads 22-1 and 22-2 are connected via signal lines to a head IC 24 (also called a PreAmp IC) serving as a head control circuit. The head IC 24 selects a head in accordance with a head select signal based on a write command or a read command from a host serving as a higher-level apparatus, and performs writing or reading. The head IC 24 is provided with a write amplifier for the write system, and a preamplifier for the read system. Furthermore, up to six heads can be connected to the head IC 24 in this embodiment. However, since it mounts only a single magnetic disk medium 20, the heads 22-1 and 22-2 are connected by the use of two only of the head connecting terminals. An MPU 26 is provided on the control board 14. A memory 30 which expands the control program using an RAM for the bus 28 of the MPU 26 and stores control data and a nonvolatile memory 32 which stored the control program serving to function as a firmware using FROM are provided. For the bus 28 of the MPU 26, there are provided a host interface control unit 34, a buffer memory control unit 36 which controls the buffer memory 38, a hard disk controller 40 having a function as a format control unit, a read channel 42 serving as a write modulating unit and a read modulating unit, and a servo control unit 44 using DSP or the like which controls the voice coil motor 18 and a spindle motor 16. The magnetic disk apparatus 10 performs writing processing and reading processing on the basis of a command from the host. Usual operation in the magnetic disk apparatus 10 will now be described. Upon receipt of the write command and write data from the host by the host interface control unit 34, the write command is decoded at the MPU 26, and the received write data are stored as required in the buffer memory 38. Then, the data are converted by the format control function of the hard disk controller 40 into a prescribed data format. The ECC code is added through ECC processing, and after scrambling in the write modulation system in the read channel 42, an RLL code conversion and further a write compensation, it is written into the magnetic disk medium 20 from, for example, the write head of the selected head 22-1 from the write amplifier via the head IC. At this point in time, a head positioning signal is issued by the MPU 26 to the servo control unit 44. The head driven by the voice coil motor 18 is sought on a target track designated by the command, and then, the on-track head is following-controlled. The spindle motor 16 is of course driven upon activation along with power-on of the magnetic disk apparatus 10 and rotates the magnetic disk medium 20, for example, at a constant speed of 5,400 rpm. Upon receipt of the read command from the host, on the other hand, by the host interface control unit 34, the read command is decoded in the MPU 26. After amplifying, by the amplifier, the read signal read out from the read head selected by the head select of the head IC 24, it is entered into the read modulation system of the read channel. The read data is demodulated through virtual response maximum likelihood detection (PRML) or the like to detect and correct an error by performing the ECC processing in the hard disk controller 40, and thereafter, it is buffered to the buffer memory 38, and the read data is transferred from the host interface control unit 34 to the host. In this magnetic disk apparatus 10, in the present invention, an optimum loop gain is set so as to maintain servo control properties for rotating the spindle motor 16 at a constant speed such as 5,400 rpm by the spindle motor control unit 46 provided as a control function of the servo control unit 44. For the purpose of setting a loop gain, a loop gain measuring unit 48 and a loop gain setting unit 50 are provided in the MPU 26. A default gain table 52 is provided in the nonvolatile memory 32. Setting of loop gain to the spindle motor control unit 46 can cope with any of single disk loading and two-disk loading of the number of magnetic disks to be loaded onto the disk enclosure.

Figure 2:
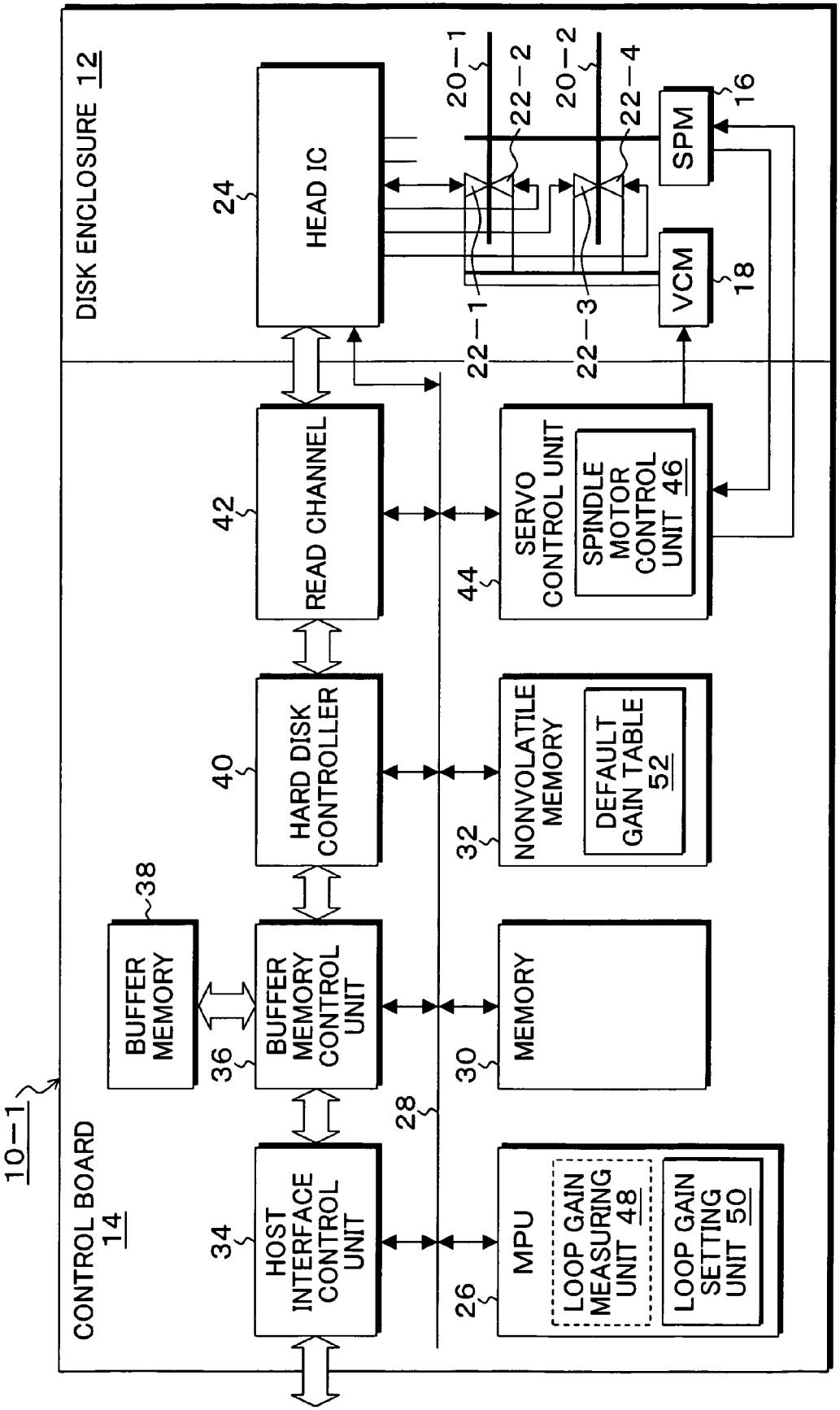
FIG. 2 is a block diagram when applying the present invention to a magnetic disk apparatus having two media.

FIG. 2 is a block diagram of a magnetic disk apparatus 10-1 which is the magnetic disk apparatus to which the present invention is applied, and is of the two-disk-loading type. Two disk media 20-1 and 20-2 are loaded on the rotation shaft of the spindle motor 16 of the disk apparatus 12. Heads 22-1 and 22-2 are therefore provided so as to face the recording faces on both sides of the disk medium 20-1, and heads 22-3 and 22-4 are further provided so as to face the recording faces on both sides of the disk medium 20-2, these being connected to the head IC 24. In the magnetic disk apparatus 10-1 shown in FIG. 2, there are loaded two magnetic disk media 20-2 and 20-2, and further, four heads 22-1 to 22-4 are provided in correspondence thereto. Except for these points, the magnetic disk apparatus 10-1 is basically the same as the magnetic disk apparatus 10 shown in FIG. 1 for the disk enclosure 12 and the control board 14. The magnetic disk apparatus 10 shown in FIG. 1 and the magnetic disk apparatus 10-1 shown in FIG. 2 are compared. The enclosure, the disk enclosure 12 and the control board 14 are manufactured as basically the same components. The only difference lies in whether the manufacturing plan is directed toward single-disk loading or two-disk loading. For the purpose of optimizing the loop gain at the spindle motor control unit 46 against this difference in the number of media, in the present invention, the default gain table 52 is provided in the nonvolatile memory 32. The default gain table 52 stores a loop gain G1 for loading of a single medium and a loop gain G2 for loading of two media in correspondence to the number of media as shown in FIG. 3.

Figure 3:
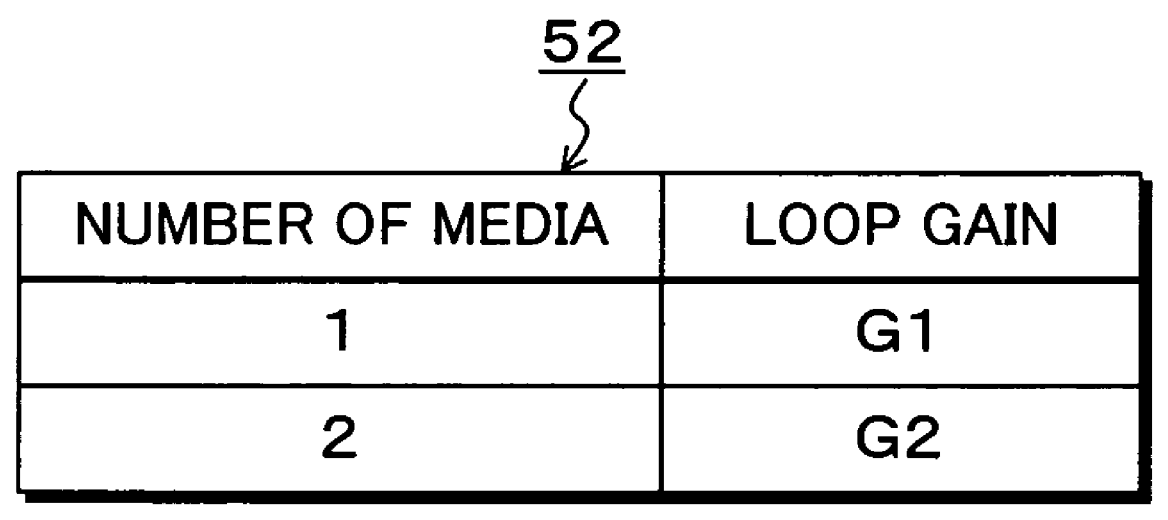

The loop gains corresponding to the number of media stored in the default gain table shown in FIG. 3 are stored through execution of loop gain measuring and adjustment by the loop gain measuring unit 48 shown by a broken line, which is achieved by a program downloaded as firmware in the test stage during the manufacturing process of the magnetic disk apparatus 10. The loop gain measuring unit 48 is activated in the test stage of the manufacturing process, measures the loop gain of the spindle motor control unit 46 and adjust the measured loop gain into an optimum loop gain corresponding to a single medium. Through a statistical processing such as determination of an average over such values measured for a plurality of magnetic disk apparatus 10, and a resultant loop gain G1 is stored in the default gain table 52. This is also the case with the magnetic disk apparatus 10-1 mounting two magnetic disk media 20-1 and 20-2. Through execution of the loop gain measuring unit 48 demodulated in the test stage of the manufacturing process, an optimum loop gain for two media is measured and adjusted for a plurality of apparatuses. A loop gain G2 obtained by averaging results is stored in the default gain table 52 as shown in FIG. 3. The loop gain measuring units 48 in FIGS. 1 and 2, being deleted upon completion of the test processing, not mounted upon shipment, are expressed by dotted lines.

Figure 4:
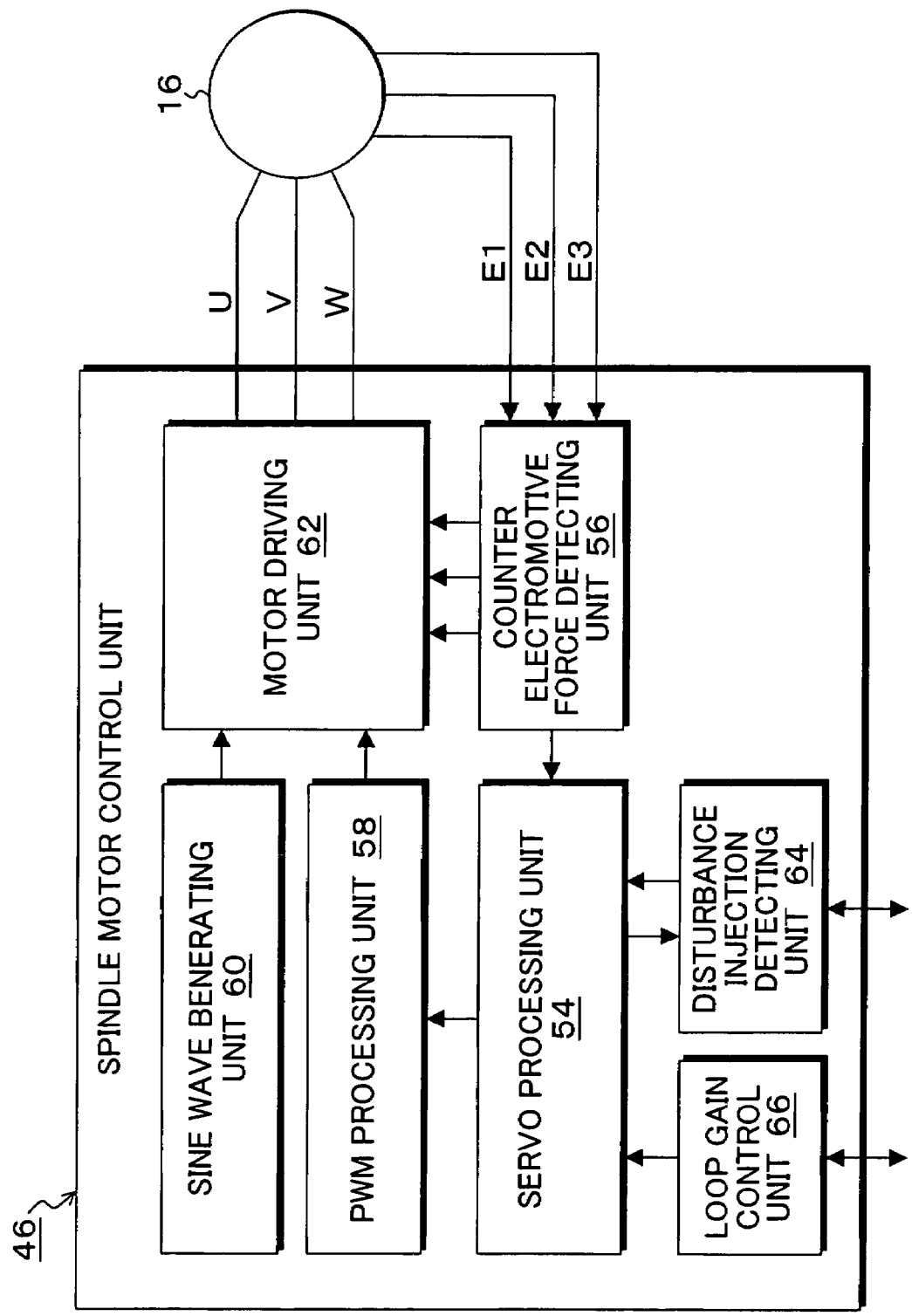
FIG. 4 is a block diagram of the single motor control unit shown in FIG. 1.

FIG. 4 is a block diagram of the functional configuration of the spindle motor control unit 46 shown in FIG. 1. In FIG. 4, the spindle motor control unit 46 comprises a servo processing unit 54, a counter electromotive force detecting unit 56, a PWM processing unit 58, a sine wave generating section 60, and a motor driving unit 62. Further for servo gain measurement and servo gain setting in the present invention, a disturbance injection detecting unit 64 and a loop gain control unit 66 are provided. The servo processing unit 54 shown in FIG. 4 is composed of a target speed setting unit 68, an adding unit 70, a proportional integration unit 70, another adding unit 74, a motor speed detecting unit 76, a disturbance injection register 78, and a response detecting register 80 as shown in FIG. 5.

Figure 5:
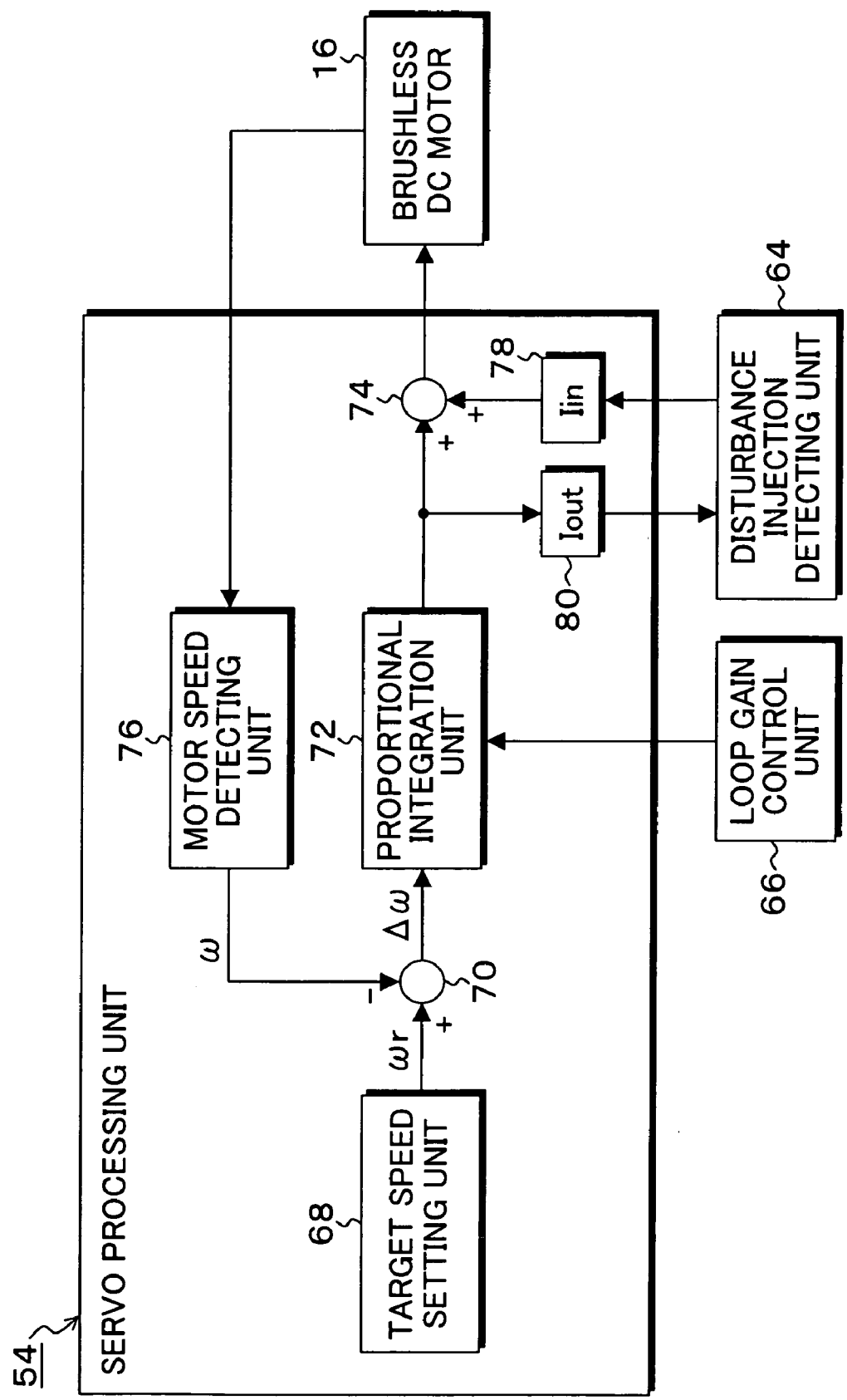
FIG. 5 is a block diagram of the servo processing unit shown in FIG. 4.

In the servo processing unit 54 shown in FIG. 5, a target speed ωr set by the target speed setting unit 68 is outputted to the adding unit 70. A motor speed ω is detected by the motor speed detecting circuit 76 from a counter electromotive force detecting signal, one of the phases, of the counter electromotive force detecting unit 56 shown in FIG. 4 of the spindle motor (brushless DC motor) 16. The detected motor speed ω is entered into the adding unit 70, and a speed difference Δω is determined by subtracting the motor speed Δω from the target speed ωr. The speed difference Δω is entered into the proportional integration unit 72, and a proportional integrating operation is performed by means of a transfer function:

$$Kp(1+Ki/s).$$

The proportional integration output is converted into a current signal, and driving current is outputted to the spindle motor 16. Output of driving current to the spindle motor 16 from the servo processing unit 54 shown in FIG. 5 is carried out more particularly by the PWM processing unit 58, the sine wave generating unit 60, the motor driving unit 62 and the counter electromotive force detecting unit 56 shown in FIG. 4. The servo processing unit 54 in FIG. 4 outputs from the proportional integration unit 72 shown in FIG. 5 a proportional integration signal corresponding to the speed difference Δω to the PWM processing unit. The PWM processing unit 58 performs duty control based on the proportional integration signal corresponding to the speed difference from the servo processing unit 54.

This duty control controls the duty ratio of a sine wave signal by switching a sine wave signal from the sine wave generating unit 60 having a frequency dependent on the revolutions of the spindle motor 16 at a switching frequency higher than such a frequency. The motor driving unit 62 supplies sine wave signals having controlled duty ratios to coils of the individual phases of the spindle motor 16 as current signals of U-shape and W-phase at timings of the individual phases of the spindle motor 16 obtained from the counter electromotive force detecting unit 56, and controls them so as to maintain a target speed ωr. The counter electromotive force signals E1, E2 and E3 of the individual phases resulting from rotation of the spindle motor 16 are detected at the counter electromotive force detecting unit 56 and controls the phase of the PWM-controlled 3-phase sine wave current signal in the motor driving unit 62. The disturbance injection detecting unit 64 provided in the servo processing unit 54 applies sine wave disturbance Iin set in the register 78 to the adding unit 74 for measuring the loop gain. It sets the response current Iout after application of the sine wave disturbance Iin to the register 80 and detect it. The response current Iout of the register 80 is sent to the loop gain measuring unit 48 provided in the MPU 26 shown in FIG. 1 to cause adjustment processing to an optimum loop gain. The loop gain control unit 66 provided for the servo processing unit 54 performs setting control of setting a loop gain read out in correspondence to the detected number of media from the default gain table 52 of the nonvolatile memory 32 in the proportional integrator 72 upon activation along with turning-on of power of the magnetic disk apparatus 10 in the loop gain setting unit 50 shown in FIG. 1.

Figure 6:
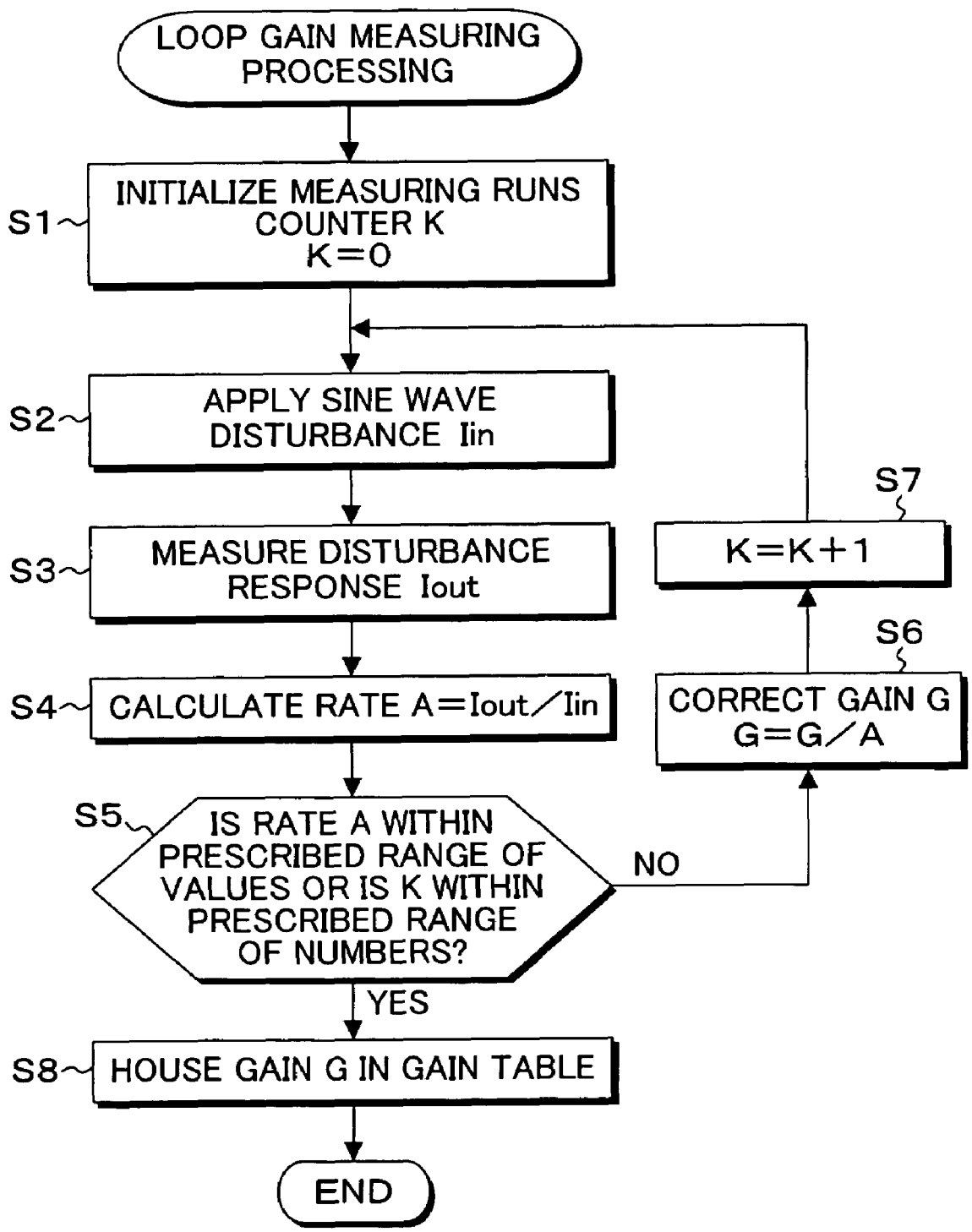
FIG. 6 is a flowchart of the loop gain measuring processing in the present invention.

FIG. 6 is a flowchart of the loop gain measuring processing executed in the loop gain measuring unit 48 of the MPU 26 provided in the magnetic disk apparatus 10 shown in FIG. 1. In the embodiment shown in FIG. 1, the loop gain measuring processing is executed in the test stage of the manufacturing process. In FIG. 6, the loop gain measuring processing comprises the steps of step S1 of initializing the number of measuring times counter K to K=0, then, step S2 of applying a sine wave disturbance Iin to the adding unit 74 of FIG. 5, and step S3 of measuring a disturbance response Iout outputted from the proportional integration unit 72 in correspondence to the application of disturbance. Then, in step S4, a ratio A is calculated by dividing the disturbance response Iout by the sine wave disturbance Iin as:

$A = Iout/Iin.$

Then, in step S5, it is checked whether or not the ratio A is within a prescribed range of values, or the number of measuring times counter K reaches a prescribed number of times. If the result is not satisfactory for both cases, a correction is conducted by dividing the current gain G by the ratio A calculated in step S4. Then, in step S7, the number of measuring times counter K is incremented by one, and step S2 and the subsequent steps are repeated. As a result of repetition of steps S2 to S7, when, in step S5, the ratio A reaches within the prescribed range of values, i.e., when correction is made to gain G for which the disturbance response Iout shows almost no difference from the sine wave disturbance Iin, or when the number of measuring times counter K has reached the prescribed number of times, the process advances to step S8 in which the gain G is stored in the gain table provided in the memory 30. A loop gain G1 corresponding to the number of media 1 in the default gain table 52 can be determined by averaging loop gains obtained in a plurality of apparatuses in a gain loop measuring processing carried out for a plurality of magnetic disk apparatuses 10 each mounting a single medium. Also for the magnetic disk apparatus 10-1 mounting two media shown in FIG. 2, a loop gain G2 corresponding to two media of the default gain table 52 of FIG. 3 can be determined by executing a similar loop gain measuring processing, and averaging values of loop gain G obtained for a plurality of magnetic disk apparatus 10-1.

Figure 7A:
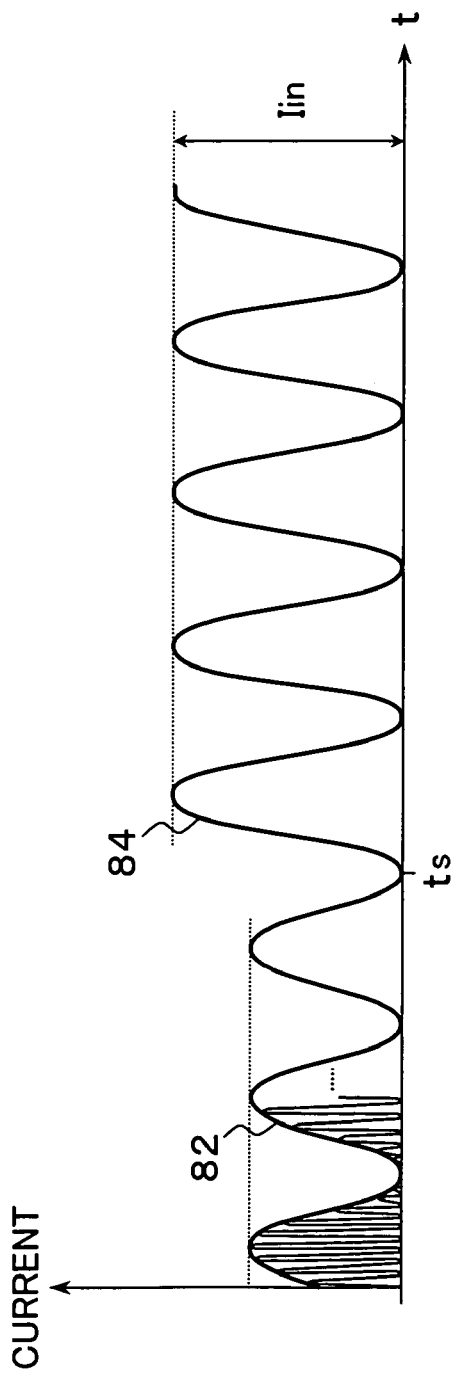
FIGS. 7A and 7B are descriptive views of a sine wave disturbance and disturbance response in the loop gain measuring processing.
Figure 7B:
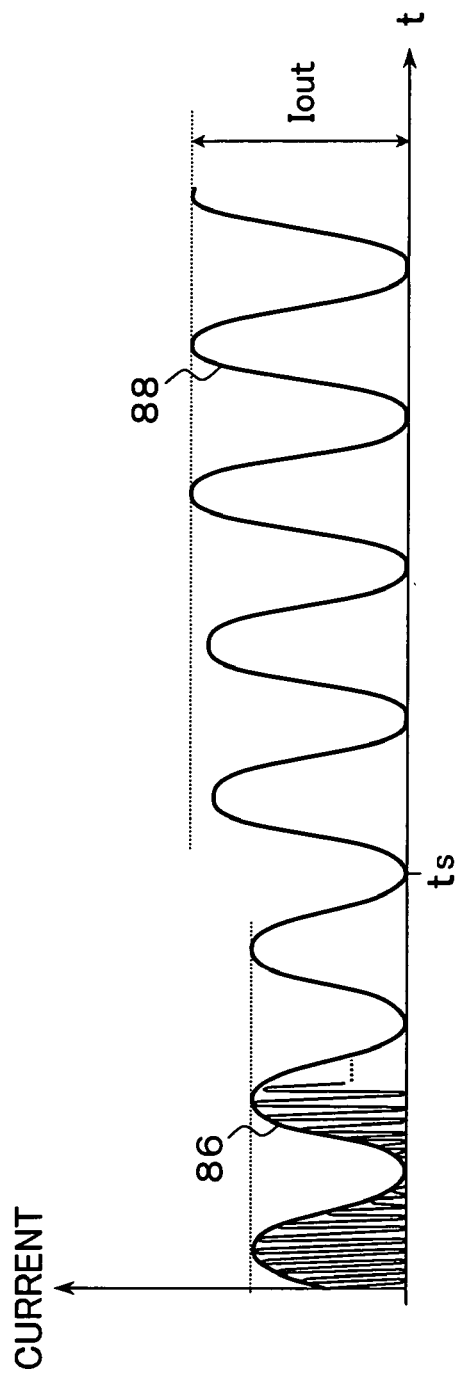

FIGS. 7A and 7B are descriptive views of application of sine wave disturbance and response waveform in the loop gain measuring processing shown in FIG. 6. FIG. 7A illustrates a current waveform outputted from the adding unit 74 of FIG. 5. Prior to the moment ts when applying a sine wave disturbance 84, sine wave driving current 82 having a constant amplitude level is outputted. If the spindle motor 16 is assumed to rotate at revolutions of 5,400 rpm, this sine wave driving current 82 would have a frequency of 540 Hz. The sine wave of 540 Hz takes the form of a signal in which the duty ratio is controlled through PWM control using a switching frequency of 150 kHz. For such a usual sine wave driving current 82, the current amplitude is changed into Iin by applying the sine wave disturbance 84 at the moment ts upon measuring loop gain. FIG. 7B illustrates the response current from the proportional integration unit 72 of FIG. 5, which has been a response current 86 having a current amplitude corresponding to the then loop gain before application of the sine wave disturbance 84 at moment ts, and upon application of the sine wave disturbance 84 at moment ts, the amplitude slowly increases under the effect of a delay in response caused by the integrating operation of the proportional integration unit 72 up to stabilization at a certain value, thus giving a disturbance response 88. For this disturbance response 88, the current amplitude is detected as Iout, and in step S4 of FIG. 6, the ratio A (=Iout/Iin) is determined. When there is a difference between the sine wave disturbance 84 and the disturbance response 88, for example, when Iin=1.0 and the disturbance response Iout=0.8, the current gain G is corrected into a gain leading to G=1.25 G by dividing the current gain G by:

$A = Iout/Iin = 0.8/1.0.$

Figure 8A:
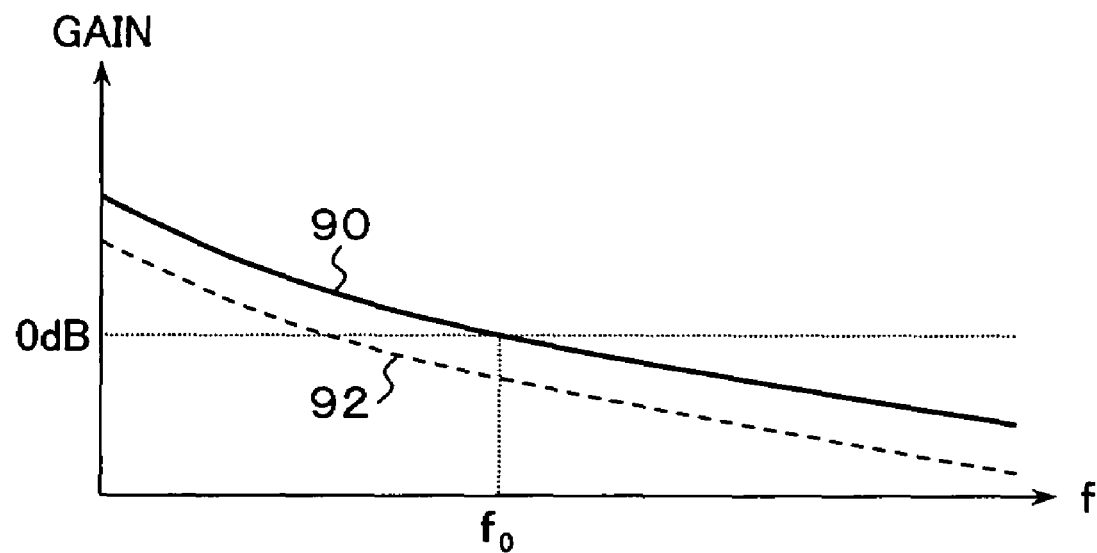
FIGS. 8A and 8B are descriptive views of servo control property in a case where the number of media is changed from one to two.
Figure 8B:
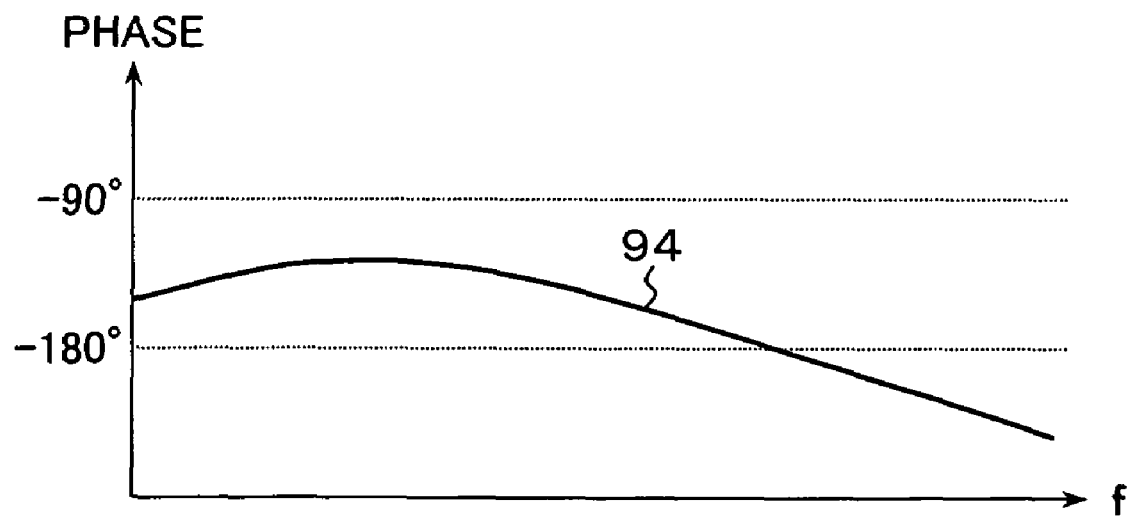

FIGS. 8A and 8B are descriptive views of servo control property in the case where the number of media is changed from 1 to 2. FIG. 8A shows the gain property of servo loop corresponding to frequency F. The single-medium property 90 is represented by a solid line and the two-medium property, by a broken line. In this example, a case where, for the single-medium property 90, frequency fo results in zero cross with 0 dB is assumed to be an optimum loop gain. When it is desired to mount two media in the case of a spindle motor control unit of a loop gain leading to such a single-medium property 90, the loop gain decreases so as to match the two-medium property 92 by causing an increase in inertia of the spindle motor. In this case, the two-medium property 92 is determined in the form of parallel displacement from the single-medium property 90 by an amount corresponding to the increment in the number of media. FIG. 8B represents phase property 94 relative to frequency f. There is no difference in phase property 94 between the single-medium and the two-medium, showing matched phase properties.

Figure 9A:
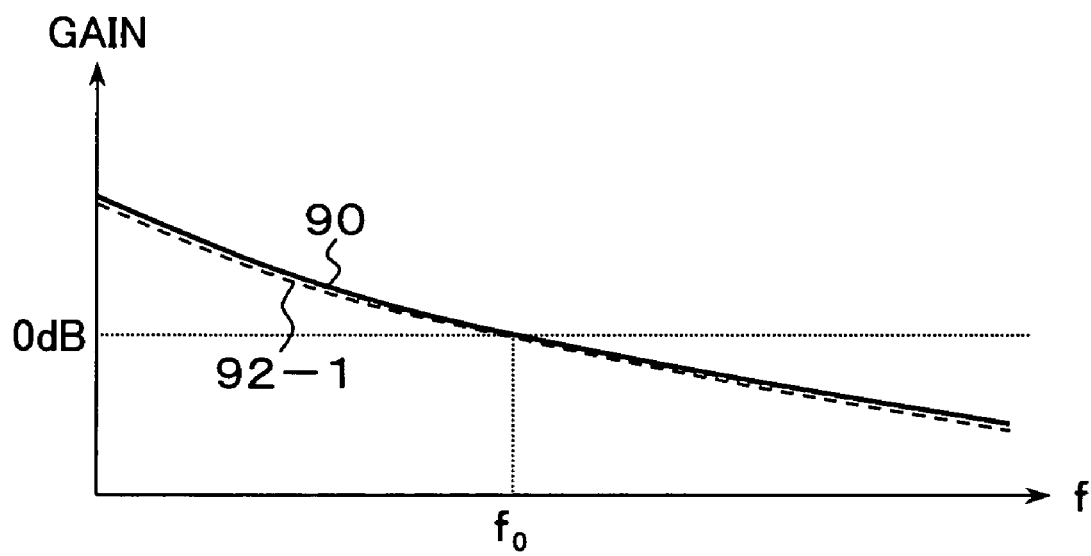
FIGS. 9A and 9B are descriptive views of adjustment of servo control property in setting of a servo gain relative to the difference in the number of media.
Figure 9B:
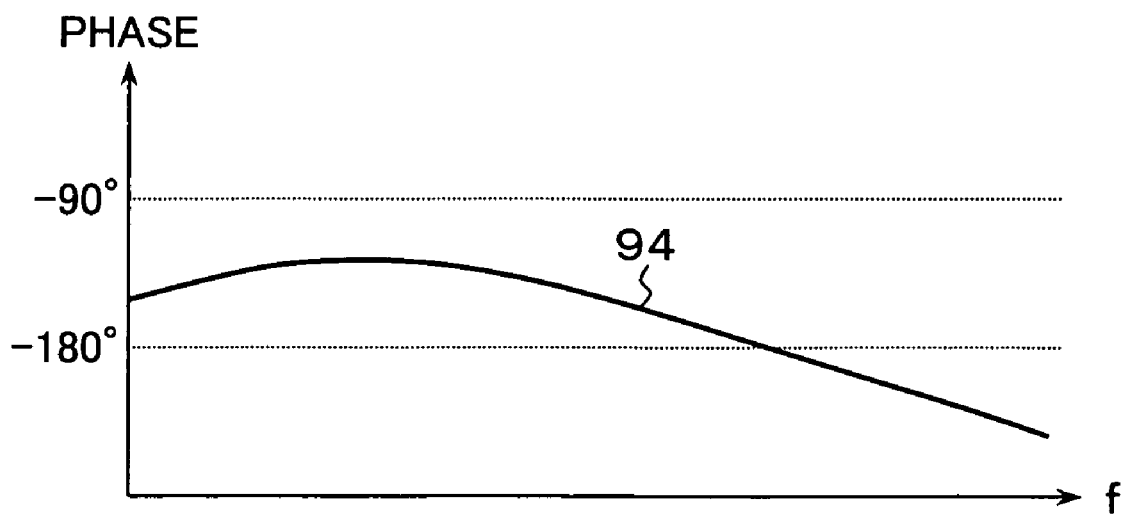

The single-medium property 90 shown in FIG. 9A gives an optimum loop gain for the spindle motor control unit in the single-medium magnetic disk apparatus. For the two-medium property 92, in contrast, the frequency leading to an optimum property is fo and the gain is lower than 0 dB. In the present invention, therefore, in the magnetic disk apparatus 10-1 mounting two media shown in FIG. 2, the measured and adjusted two-medium property 92-1, i.e., a loop gain having a control property leading to a gain of 0 dB zero cross at a frequency fo as shown in FIG. 9A can be obtained by measuring and correcting the loop gain through a loop gain measuring processing shown in FIG. 6 by the loop gain measuring unit 48. More specifically, a loop gain giving the two-medium property 92-1 is determined, and it is set as the loop gain G2 corresponding to two media in the default gain table 52. FIG. 9B represents the phase property 94 for a frequency f, which is the same as that before adjustment.

Figure 10:
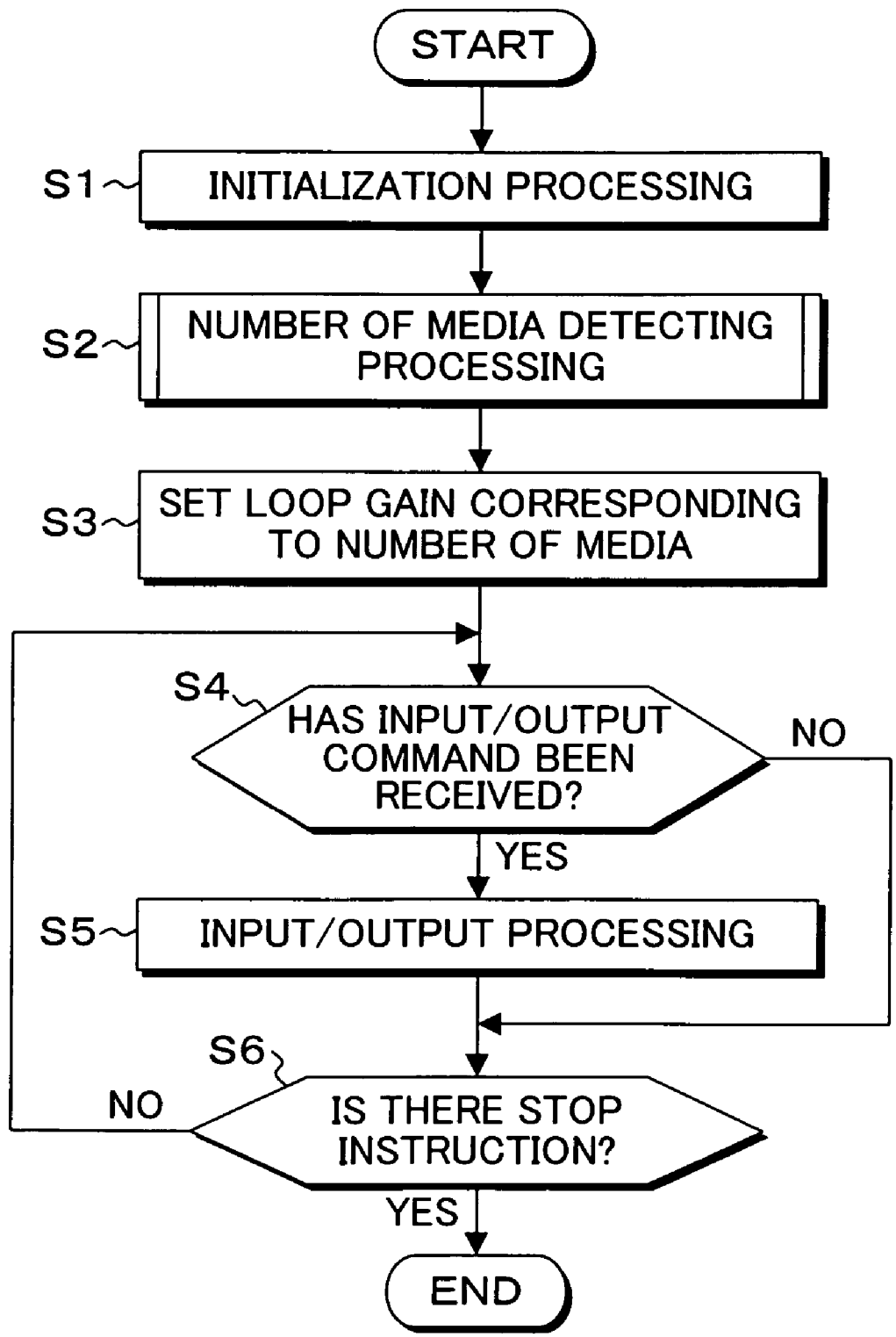
FIG. 10 is a flowchart of the loop gain setting processing in the embodiment shown in FIG. 1.

FIG. 10 is a flowchart of the loop gain setting processing in the embodiment shown in FIG. 1. In FIG. 10, when power is turned on for the magnetic disk apparatus 10 of FIG. 1, an initialization processing is executed in step S1, and then in step S2, a number of media detecting processing is executed. Then in step S3, a loop gain corresponding to the detected number of media is read out from the default gain table 52 and is set in the spindle motor control unit 46 to carry out servo control so as to maintain a constant speed such as 5,400 rpm of the spindle motor 16. Then in step S4, it is checked whether or not the input/output command is received from the host. Upon receipt of the command, the corresponding input/output processing is executed in step S5, and this is repeated until a stop instruction is received in step S6.

Figure 11:
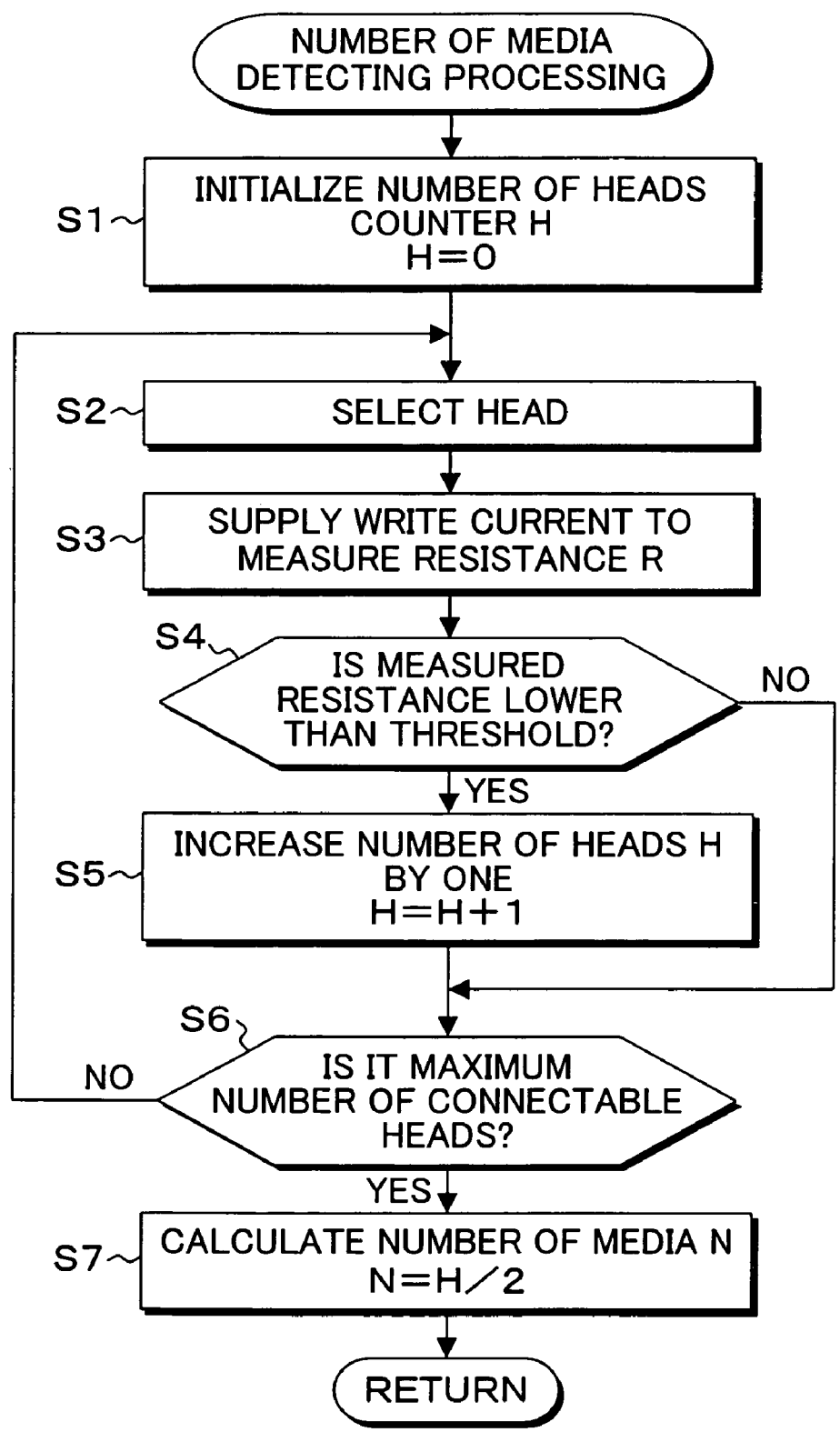
FIG. 11 is a flowchart illustrating details of the medium number detecting processing in step 2 of FIG. 10.

FIG. 11 is a flowchart of the number of media detecting processing in step S2 of FIG. 10. In FIG. 11 the number of media detecting processing in step S2 of FIG. 10. In FIG. 11, the number of media detecting processing comprises initializing the number of heads counter H to H=0 in step S1, and then in step S2, head select is sequentially carried out in the order to head numbers for the head IC 24 in FIG. 1. In step S3, sense current is supplied to the selected head to measure resistance R. At this moment, if the head is connected, current flows. Leading to a low resistance value. On the other hand, if the head is not connected, almost no current flows so that a high resistance value is obtained by measuring. Then in step S4, it is checked whether or not the measured resistance is lower than a threshold value. If it is lower than the threshold value, this indicates that the head is connected. In step S5, therefore, the number of heads H is incremented by one. Then in step S6, it is checked whether or not the maximum number of heads capable of being connected has been reached, and if not, the process advances to step S2, in which the next select is carried out and the same steps are repeated. When the maximum number of heads capable of being connected has been reached in step S6, the process goes to step S7 in which the number of media N is calculated by dividing the number of heads H counted in step S5 by 2.

Figure 12:
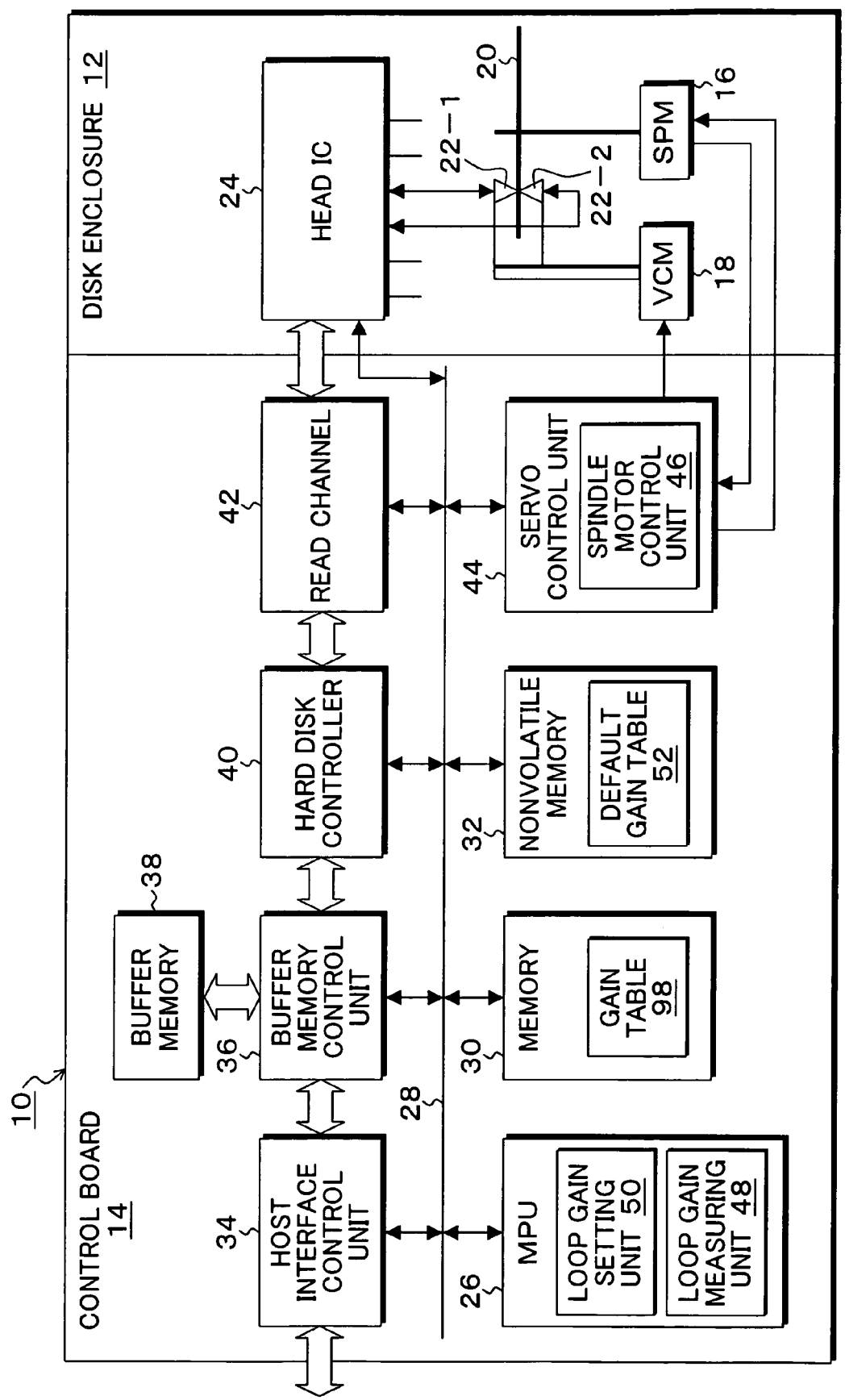
FIG. 12 is a block diagram of another embodiment of the present invention in which adjustment is made by measuring an optimum loop gain following the default loop gain.

FIG. 12 is a block diagram of another embodiment of the present invention. In this embodiment, an optimum loop gain intrinsic to the apparatus is measured by the use of the default loop gain and adjusted. In FIG. 12, the magnetic disk apparatus 10 is basically the same as that in the embodiment of FIG. 1. In the embodiment of FIG. 1, the program of the loop gain measuring unit 48 used in the manufacturing stage is deleted from the nonvolatile memory 32 and serves as a shipping firmware which is a shipping program. In the embodiment of FIG. 12, the loop gain measuring unit 48 remains in the magnetic disk apparatus 10 in shipment. When a user gets and uses the magnetic disk apparatus 10, loop gain measuring adjustment can be automatically accomplished by the apparatus itself. The default gain table 52 of the nonvolatile memory 32 is the same as that in the embodiment of FIG. 1. Loop gains G1 and G2 corresponding to the single-medium and two-medium types statistically prepared in the manufacturing stage are registered therein as default values. The loop gain setting unit 50 of the MPU 26 sets a loop gain corresponding to the number of media in the default gain table 52 of the nonvolatile memory 32 upon power-on for the first time for the magnetic disk apparatus 10 in the spindle motor control unit 46. Therefore, the loop gain measuring unit 48 is activated in the idling state to determine an optimum loop gain intrinsic to the apparatus through measuring adjustment, and setting in the spindle motor control unit 46 is changed into the optimum loop gain determined by the loop gain measuring unit 48. The optimum loop gain determined by the loop gain measuring unit 48 is stored in the system area of the medium 20. Upon the second and subsequent power-on, the loop gain is read out from the system area of the magnetic disk medium 20 into the memory 30 in the form of the gain table 98. The optimum loop gain obtained from the loop gain measuring unit 48 of the apparatus itself, stored in the gain table 98 is set in the spindle motor control unit 46 for control.

Figure 13:
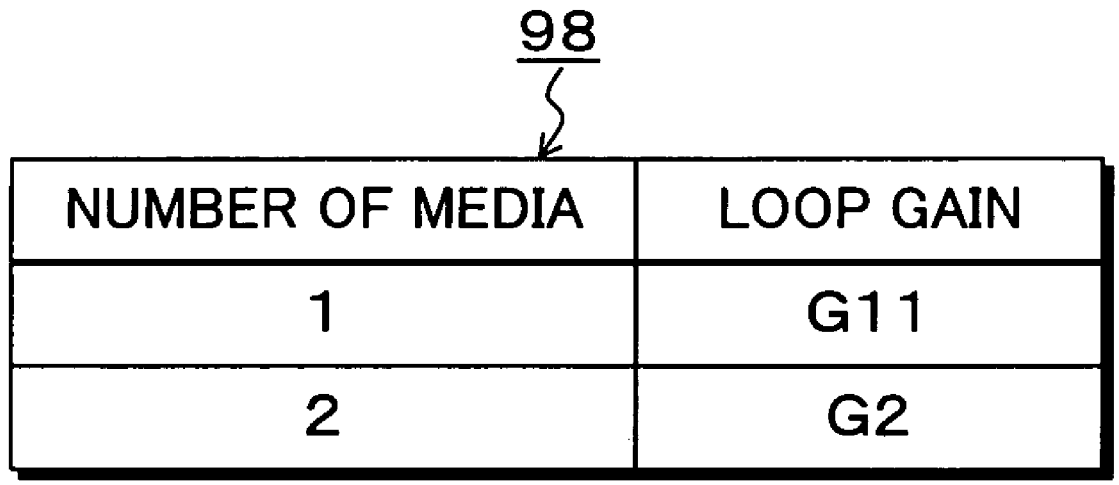
FIG. 13 is a descriptive view of the gain table shown in FIG. 12.

FIG. 13 is a descriptive view of the gain table 98 of the memory 30 shown in FIG. 12. Since the magnetic disk apparatus 10 shown in FIG. 12 is of the single-medium type, not the default gain G1, but the optimum loop gain G11 obtained from the loop gain measuring unit 48 during management of the apparatus is stored in correspondence to the single medium. For the two-medium area, measurement by the loop gain measuring unit 48 is not existent. The default loop gain G2 is therefore stored as it is.

Figure 14:
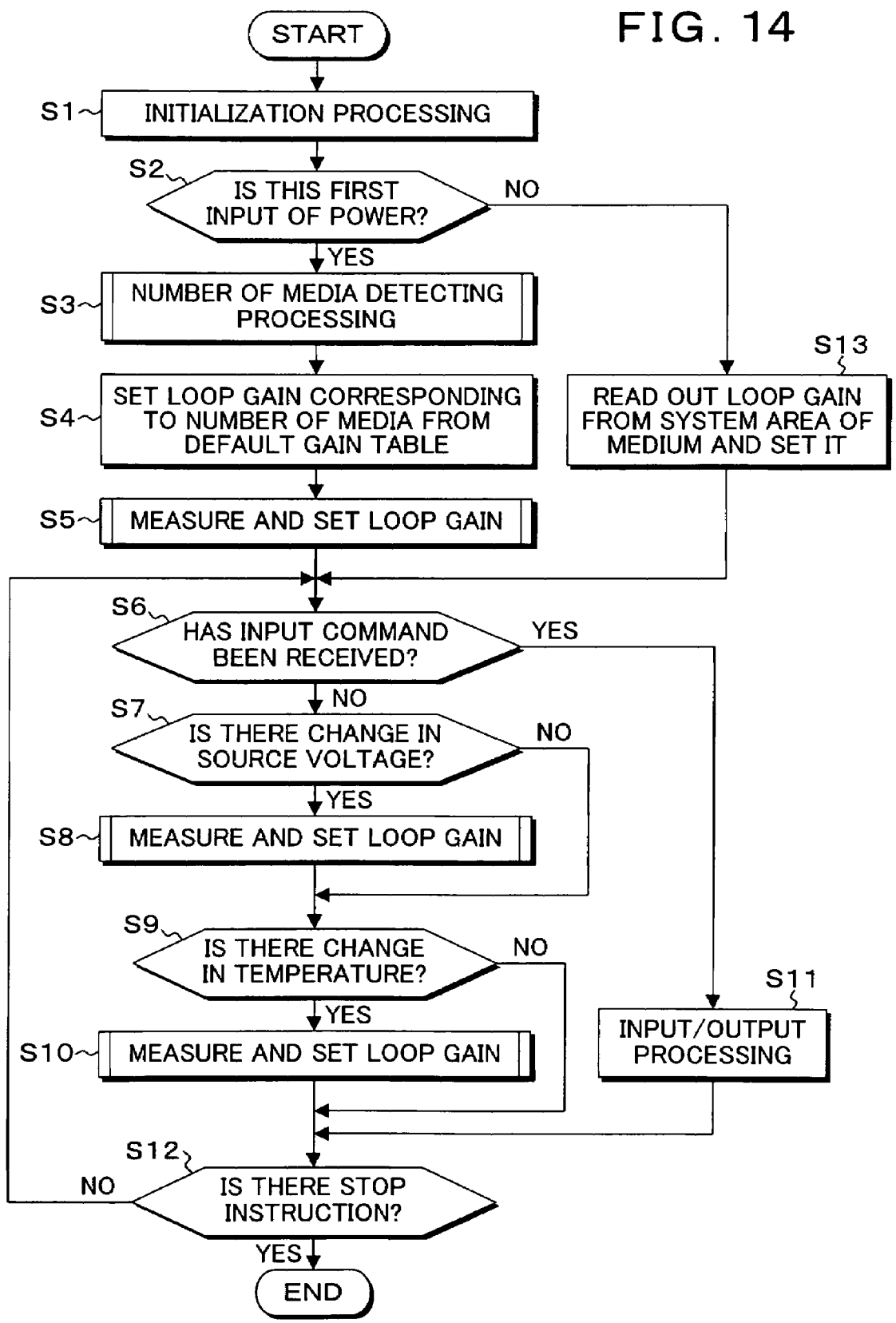
FIG. 14 is a flowchart of the loop gain setting processing in the embodiment shown in FIG. 12.

FIG. 14 is a flowchart of the loop gain measuring processing in the embodiment shown in FIG. 12. In FIG. 14, after conducting an initialization processing along with the first power-on of the magnetic disk apparatus in step S1, it is checked whether or not this is the first power-on in step S2. Since this is the first power-on, the process advances to step S3, in which a number of media detecting processing is performed. The number of media detecting processing forms the contents of the flowchart of FIG. 11. Then in step S4, a loop gain corresponding to the number of media is read out from the default table 52, and is set in the spindle motor control unit 46. Therefore, immediately after activation of the magnetic disk apparatus 10, control of the spindle motor control unit 46 is performed by means of the default loop gain. Then in step S5, the processing of the loop gain measuring unit 48 is executed as shown in the flowchart of FIG. 6 to measure a loop gain optimum for the apparatus itself and the result is set in the spindle motor control unit 46. At the same time, this optimum loop gain is stored in the system area of the magnetic disk apparatus 20. Then in the next step S6, presence of a received input/output command is checked. If the input/output command is present, an input/output processing is executed in step S11. In an idling state in which no input/output command has been received, a change in source voltage is checked in step S7. A magnetic disk apparatus has a source voltage of, for example, 5 V, and the allowable range of variations of source voltage is ±10%, i.e., a range from 4.5 to 5.5 V. For example, relative to a rated voltage of 5 V, presence of a change in source voltage in units of volt is checked. Upon determination of presence of a change in source voltage in step S7, loop gain is measured in step S8 and an adjusted loop gain is set. The adjusted loop gain is simultaneously stored in the system area of the medium. This makes it possible to adjust loop gain after a change in source voltage to an optimum value. Presence of a change in temperature is checked in step S9. The range of service temperatures for a magnetic disk apparatus covers, for example, 0° C. to 60° C. A change in temperature is determined when a change in temperature exceeds ±2.5° C. relative to the current temperature. Loop gain is measured in step 10. The result is adjusted to an optimum loop gain after the change and set. The set value is stored in the system are of the disk. Step 6 and the subsequent steps are repeated until a stop instruction is received in step S12. On the other hand, upon the second and subsequent power-on of the magnetic disk apparatus, the process advances to S13 since this is not the first power-on in step S2. In this case, a loop gain is read out from the system area of the disk medium and set, and the process enters into step S6 and subsequent steps. That is, in this embodiment, at the first power-on, the default loop gain is used. For the second and subsequent power-on, the optimum loop gain measured during management upon the first power-on is set by reading out it from the system area of the disk medium.

Figure 15:
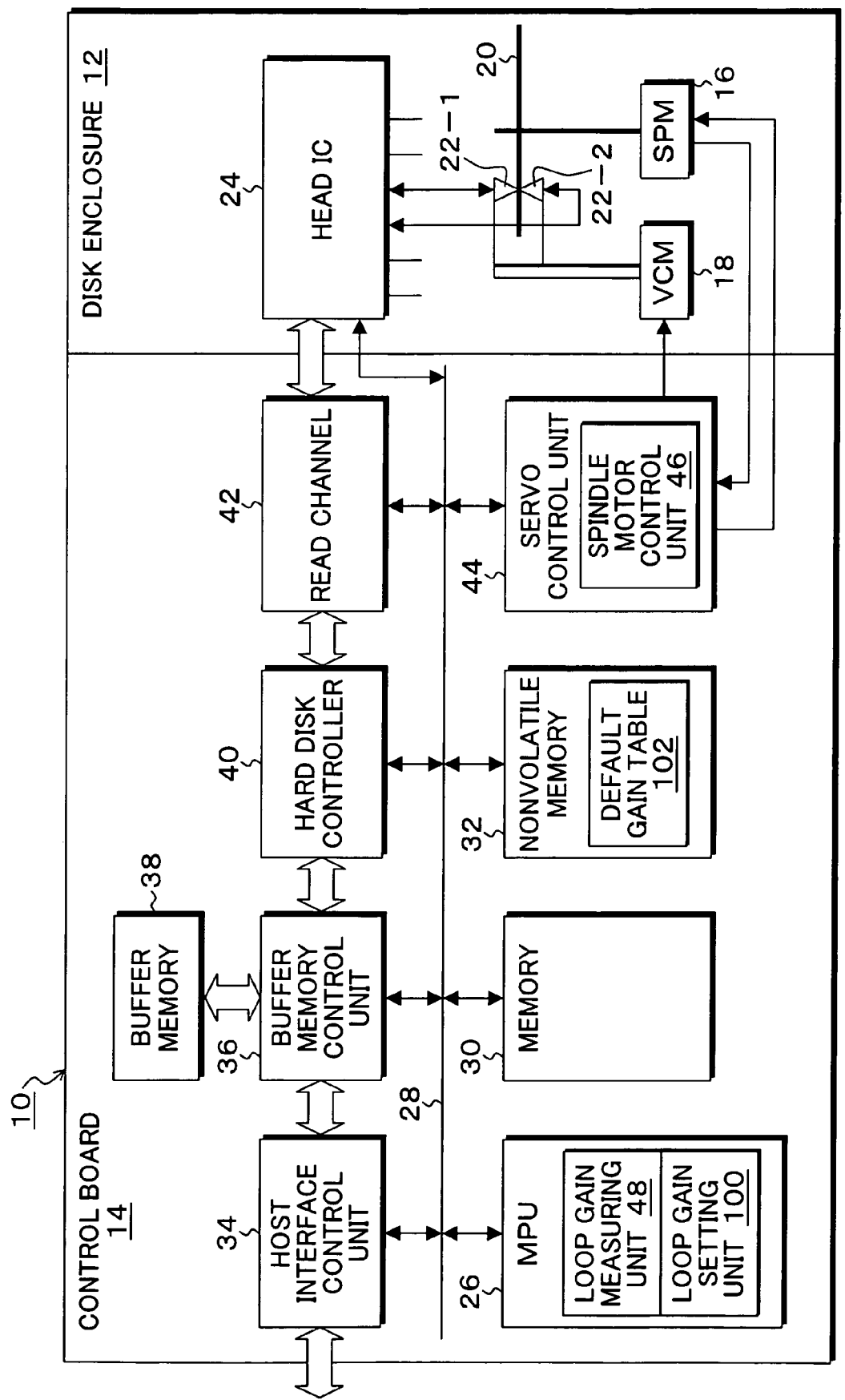
FIG. 15 is a block diagram of further another embodiment of the present invention in which a loop gain corresponding to the number of media, the temperature and the source voltage is set.

FIG. 15 is a block diagram of another embodiment of the present invention in which a loop gain corresponding not only to the number of media, but also to temperature and source voltage is set. In FIG. 15, the configuration of the disk enclosure 12 and the control board 14 is the same as in the embodiment of FIG. 1 except that the default gain table 102 provided in the nonvolatile memory 32 contains loop gains measured in correspondence to temperature and source voltage in addition to the number of media set in advance. The loop gain setting unit 100 provided in the MPU 26 in correspondence thereto reads out a loop gain corresponding to the number of media, temperature and source voltage from the default gain table 102 and sets it in the spindle motor control unit 46.

FIG. 16 is a descriptive view of the default gain table 102 of FIG. 15. In FIG. 16, the default gain table 102 sets loop gains depending upon three conditions including the number of media, temperature 3 and source voltage. The number of media is one or two in this embodiment. Since the allowable range of voltage is ±10% for a rated voltage of 5 V, a range of source voltage from a lower limit voltage of 4.5 V to an upper limit voltage of 5.5 V is set with a rated voltage of 5.0 V. For temperature, because the range of service temperatures covers from 0° C. to 60° C., three points including a lowest temperature of 0° C., a room temperature of 25° C. and a highest temperature of 60° C. are set. This default gain table 102 is prepared by providing the three conditions of the number of media, source voltage and temperature in the test stage in the manufacturing process, measuring loop gains at that point in time by means of the loop gain measuring unit 48, and determining an average over loop gains for a plurality of apparatuses for registration.

Figure 17:
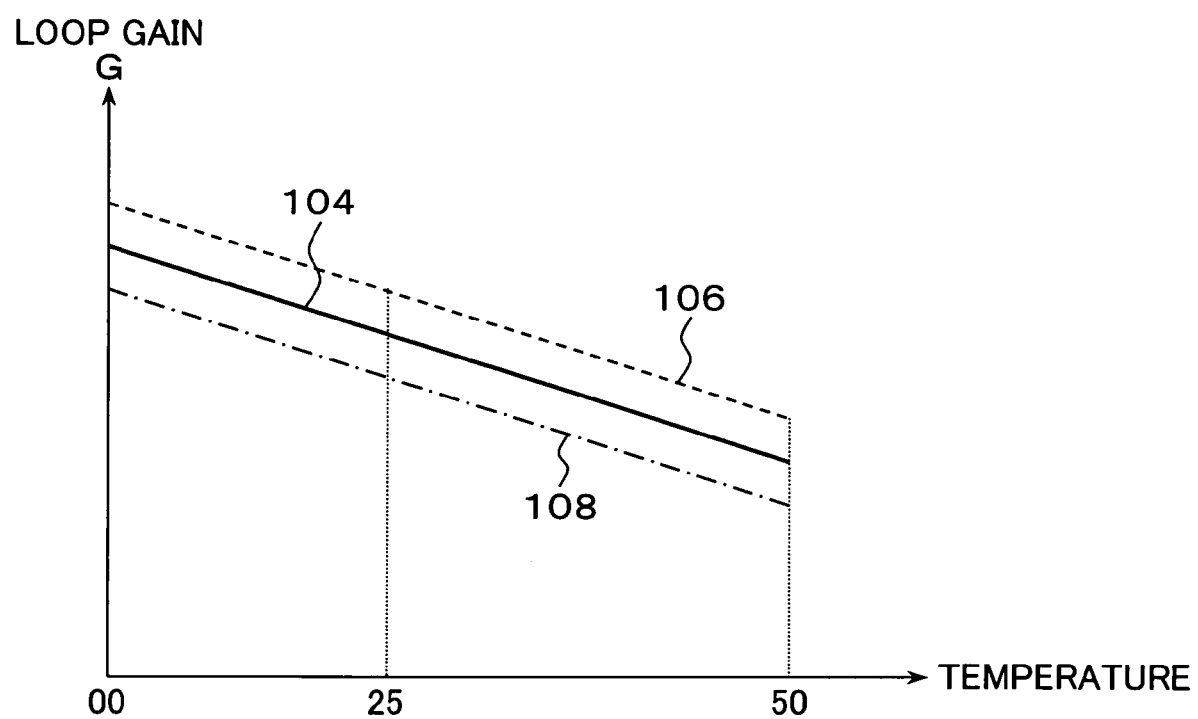
FIG. 17 is a characteristic diagram illustrating the relationship between temperature and loop gain using, as a parameter, the source voltage in the default gain table shown in FIG. 16.

FIG. 17 is a characteristic diagram illustrating the relationship between temperature and loop gain with source voltage as a parameter in the default gain table 102 of FIG. 15. In FIG. 17, the loop gain G versus temperature in rated voltage property 104 corresponding to a rated source voltage of 5.0 V is higher according as temperature is lower, and the loop gain G is lower according as temperature is higher. In contrast, the low voltage property 106 with a voltage of 4.5 V shows higher loop gains than in the rated voltage property 104. On the other hand, the high voltage property 108 with 5.5 V shows lower loop gains than in the rate 4$d$ voltage property 104. The property of loop gain relative to temperature in FIG. 17 is represented with a constant gradient to temperature change for simplicity of illustration. For some apparatus, however, this may take the form of a non-linear property. When setting a loop gain by the use of the default gain table 102 of FIG. 16, for a source voltage or a temperature not found in the table, a corresponding loop gain would be determined through complementary calculation of the values of temperature or source voltage registered in the table. More specifically, the default gain table 102 gives a rated voltage property 104, low-voltage property 106, and high-voltage property 108 as derived from the relationship between temperature and loop gain with the source voltage as a parameter as shown in FIG. 17. The procedure is therefore to determine a property corresponding to the detected source voltage from a complementary calculation of the rated voltage property 104 and the low-voltage property 106 or the rated voltage property 104 and the high-voltage property 108, and then to determine a loop gain corresponding to the detected temperature for the thus determined property.

Figure 18A:
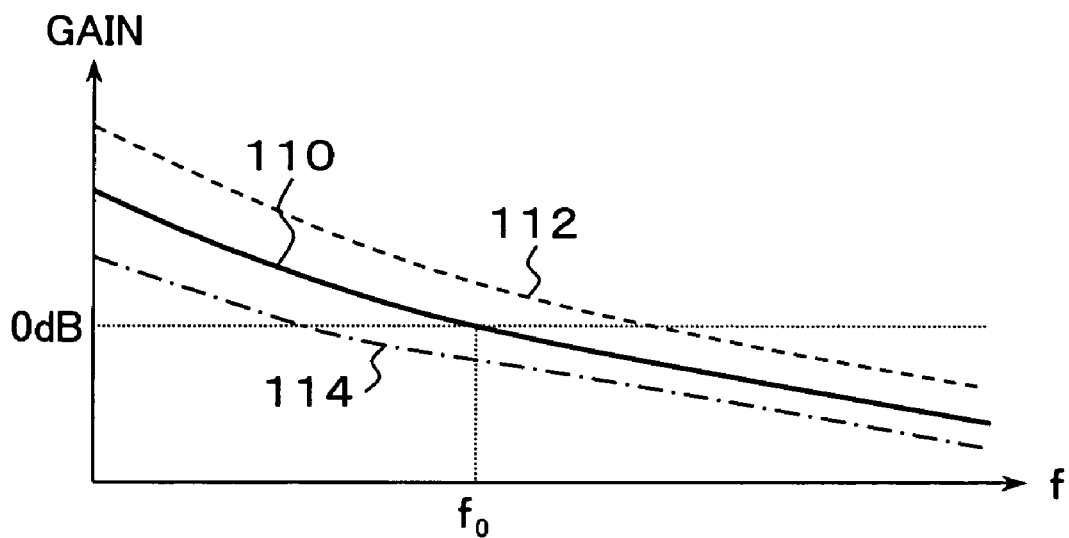
FIGS. 18A and 18B are descriptives view of changes in servo control property relative to changes in temperature.
Figure 18B:
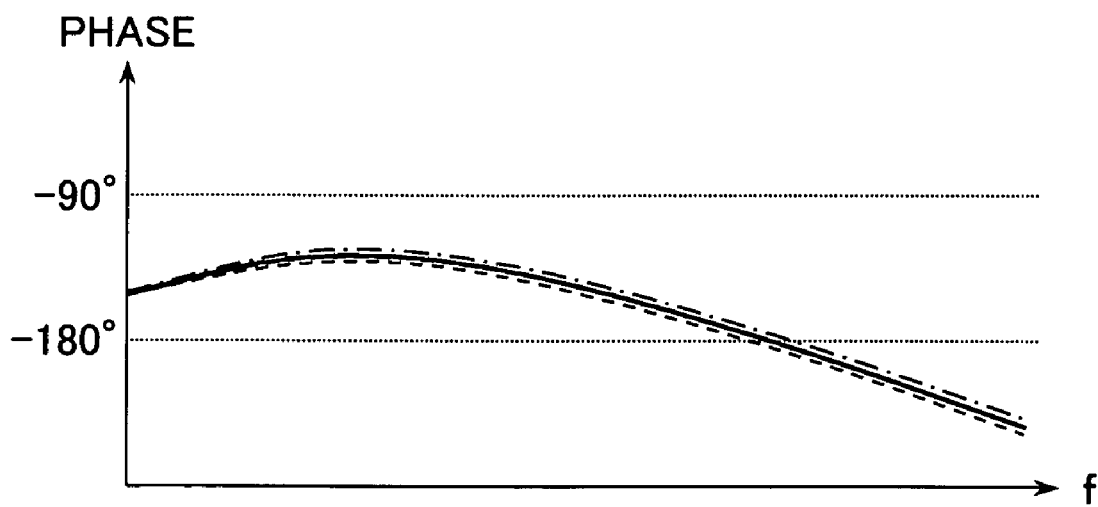
Figure 19A:
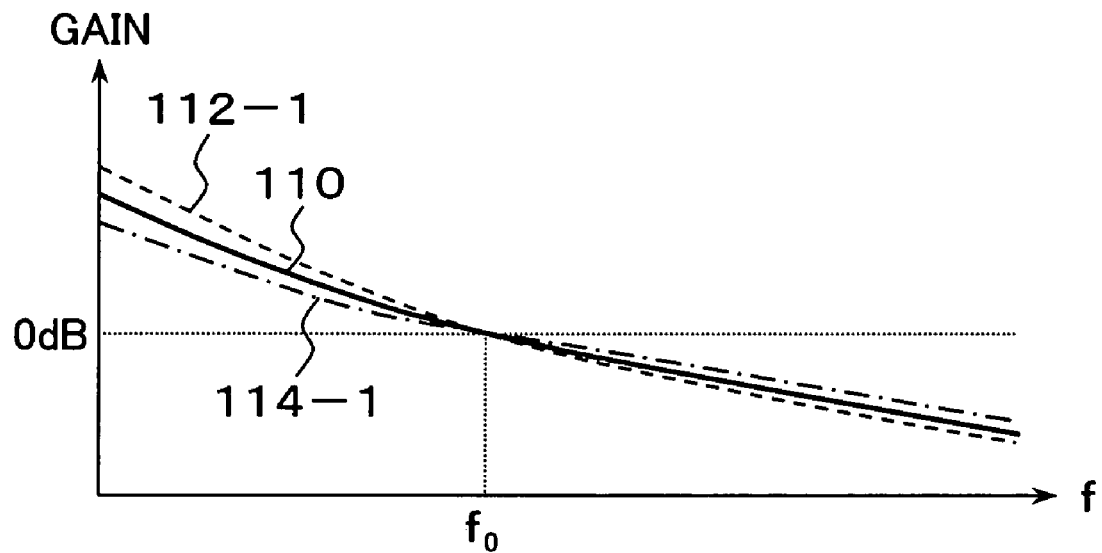
FIGS. 19A and 19B are descriptive views of the servo control property of adjustment of high-temperature property and low-temperature property so as to meet the zero-cross of the room-temperature property.
Figure 19B:
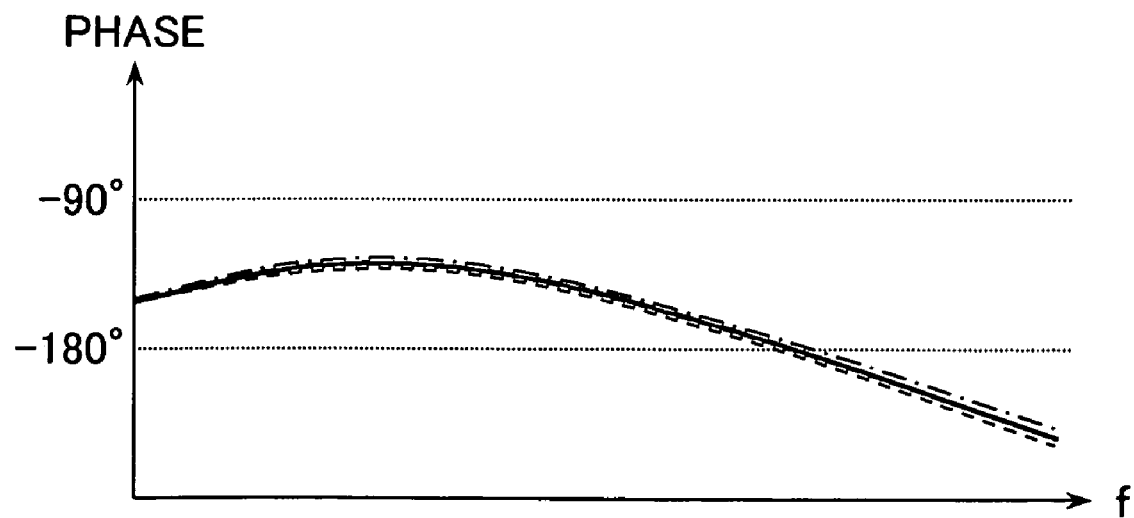

FIGS. 1A and 18B are descriptive views of changes in servo control property relative to changes in temperature. FIG. 18A represents the gain property relative to frequency. When the loop gain leading to zero cross of 0 dB at a frequency fo for the room temperature property 110 is assumed to be an optimum value, an increase in temperature resulting in the high-temperature property 112 causes gain to become excessive. On the other hand, a decrease in temperature leading to the low-temperature property causes a shortage of gain. FIG. 18B illustrates phases individually for the room temperature, high temperature and low temperature at a frequency f. The difference in room temperature property between high and low temperatures is very slight, showing almost an agreement. FIG. 19A is a characteristic graph in which the loop gain in the high-temperature property 112-1 and the loop gain in the low-temperature property 114-1 are adjusted so as to agree with the zero cross of a frequency fo of the room temperature property 110. It is possible to correct the high-temperature property 112 and the low-temperature property 114 of FIG. 18A into the high-temperature property 112-1 and the low-temperature property 114-1 of FIG. 19A and to achieve a control property substantially approximated to the room temperature property 110 by adjusting the loop gains at high temperatures and low temperatures so that zero cross of the frequency fo of the room temperature property 110 becomes an optimum value.

Figure 20:
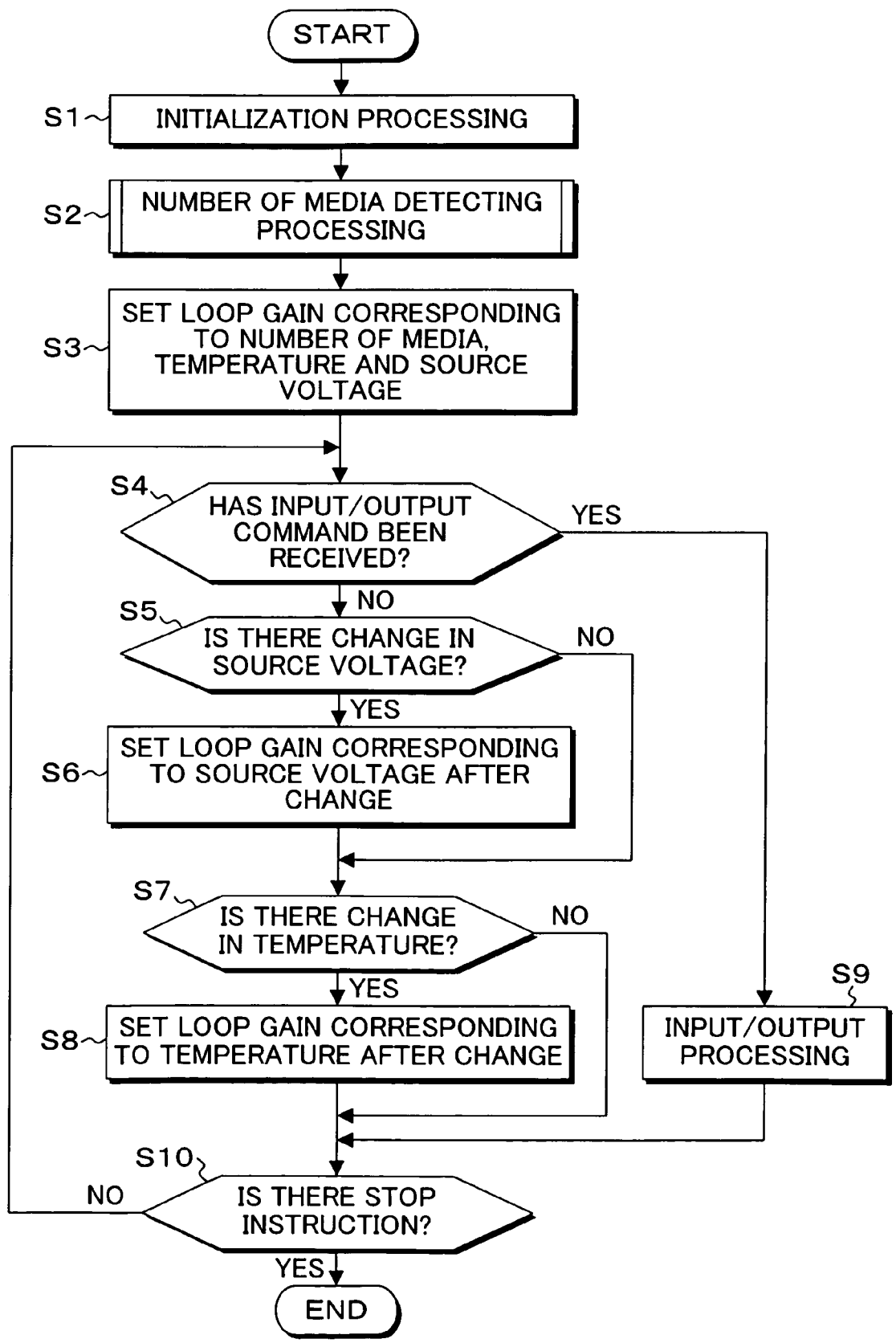
FIG. 20 is a flowchart of the loop gain setting processing in the embodiment shown in FIG. 15.

FIG. 20 is a flowchart of the loop gain setting processing in the embodiment of FIG. 15. In FIG. 20, after executing an initialization processing upon turn-on of power in step S1, a number of media detecting processing, the details of which are shown in the flowchart of FIG. 11 is performed in step S2. Then in step S3, a loop gain corresponding to to the number of media, the temperature and the source voltage is read out from the default gain table 102 and set in the spindle motor control unit 46. Then in step S4, in an idle state in which the input/output command has not been received, presence of a change in source voltage is checked in step S5. If there is a change in source voltage, a loop gain corresponding to the source voltage after change is read out from the default gain table 102 in step S6 and set in the spindle motor control unit 46. If there is a change in temperature in step S7, the loop gain corresponding to the temperature after change is read out in step S8 from the default gain table 102 and set in the spindle motor control unit 46. When receipt of the input/output command is determined in step S4, an input/output processing is executed in step S9. Thereafter, step S4 and subsequent steps are repeated until a stop instruction is received in step S10.

Figure 21:
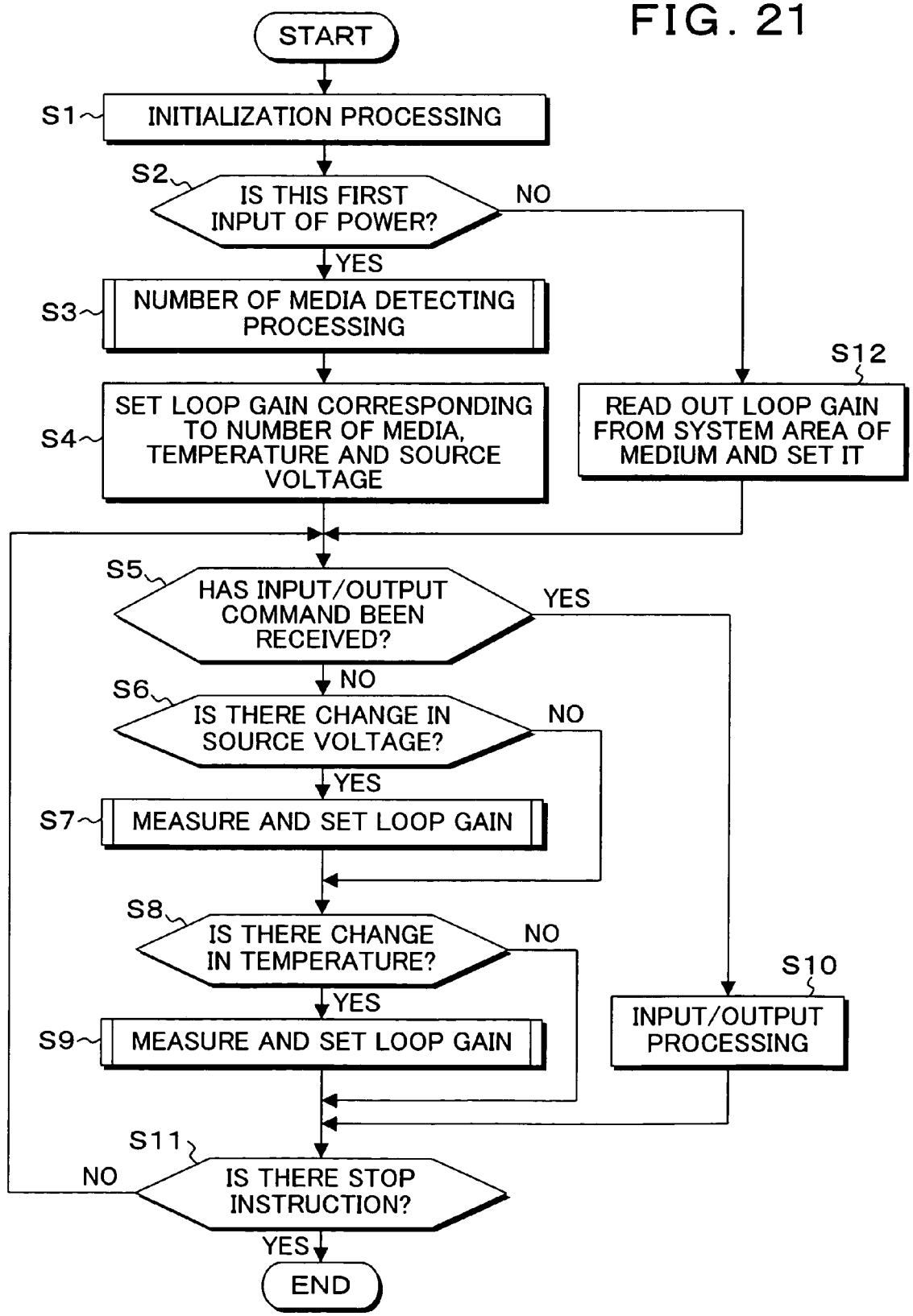
FIG. 21 is a flowchart of the loop gain setting processing for measuring and setting the loop gain by the apparatus itself after setting a default loop gain in the embodiment shown in FIG. 15.

FIG. 21 is a flowchart of a loop gain setting processing for setting an optimum value intrinsic to the apparatus by measuring loop gain by the apparatus after setting a default loop gain in the embodiment of FIG. 15. In FIG. 21, after carrying out an initialization processing upon turning power on in step S1, it is checked whether or not this is the first power-on in step S2. If the first power-on, after conducting a number of media detecting processing in step S3, a loop gain corresponding to the number of media, temperature and source voltage is read out in step S4 from the default gain table 102 and set in the spindle motor control unit 46. Then in step S5, in a idle state in which no input/output command has been received, if there is a change in source voltage in step S6, loop gain is measured and adjusted in step S7 and set in the spindle motor control unit 46. The loop gain is stored in the system area of the disk medium. If there is a change in temperature in step S8, loop gain is measured and adjusted in step S9 and set in the spindle motor control unit 46. It is stored in the system area of the disk medium. When receipt of the input/output command is determined in step S5, the input/output processing is executed in step S10. Such a processing is repeated until a stop instruction is received in step S11. Upon the second and subsequent power-on, the process advances to step S12 since this is not the first power-on in step S2. A loop gain is read out from the system area of the disk medium, and set in the spindle motor control unit 46. Processing in the step S5 and subsequent steps is the same as that upon the first power-on: when there is a change in source voltage or a change in temperature, loop gain is measured and adjusted and set in the spindle motor control unit 46. The processing of updating the loop gain in the system are is repeated.

Furthermore, the present invention provides a program for setting a loop gain to be executed by the MPU 26 of the magnetic disk apparatus. This program contains processing to be executed in each of the embodiments in correspondence to the flowcharts shown in FIGS. 6, 10, 11, 20 and 21.

The above-mentioned embodiments have covered a case where sources voltage or temperature change is detected as the timing for measuring and adjusting loop gain during operation of the apparatus. Apart from such a case, loop gain may also be measured and adjusted at an appropriate timing upon transferring to power saving operation or in an idle state in which read/write operation is not performed.

The above-mentioned embodiments have described cases with a single medium and two media. The present invention is applicable also to a case where the number of media is selected from an arbitrary range of one, two and three. Since a medium is used on both sides thereof, the number of media may be converted into a number of faces.

Cases of a magnetic disk apparatus have been described as a storage apparatus in the above-mentioned embodiments. The present invention is not however limited to such cases, but is applicable as it is to an appropriate storage apparatus in which a medium is rotation-controlled at a constant speed by a spindle motor.

The present invention includes appropriate variations without impairing the objects and advantages thereof, and is not limited by numerical values shown in the above-mentioned embodiments.

What is claimed is:

1. A storage apparatus having a spindle motor control unit which servo-controls a spindle motor so as to maintain media at certain revolutions, comprising:
a loop gain storing unit which stores a loop gain of said spindle motor control unit predetermined for each of a plurality of numbers of media; and
a loop gain setting unit which detects a number of said media in the storage apparatus, reads out a loop gain corresponding to the detected number of media from said loop gain storing unit and sends the loop gain to said spindle motor control unit.

2. The apparatus according to claim 1, wherein said loop gain setting unit detects the number of head connections to a head control circuit, and detects the number of media from the detected number of head connections.

3. The apparatus according to claim 1, wherein said loop gain setting unit measures resistance by supplying sense current while sequentially selecting head connecting terminals of said head control circuit, and when the measured resistance is lower than a prescribed value, the presence of head connection is determined and a number of head connections is detected.

4. The apparatus according to claim 1, wherein said loop gain storing unit is a nonvolatile memory storing a default gain table which stores loop gains measured in advance for each number of media.

5. The apparatus according to claim 4, further comprising a loop gain measuring unit which measures a loop gain of said spindle motor control unit and adjusts it to an optimum loop gain;
wherein said loop gain setting unit reads out a loop gain corresponding to a number of media, upon activation along with the first power-on, from said default gain table to set it in said spindle motor control unit, then adjusts said spindle motor control unit by said loop gain measuring unit to an optimum loop gain, stores said optimum loop gain in a system area of said media, and upon activation along with the second and subsequent power-on, reads out said optimum loop gain from the system area of said media to set it in said spindle motor control unit.

6. The apparatus according to claim 5, wherein said loop gain measuring unit measures a response signal obtained after application of a disturbance signal to the output signal of said spindle motor control unit, and adjusts the loop gain to an optimum value so that said response signal agrees with the disturbance signal.

7. The apparatus according to claim 1;
wherein said loop gain storing unit is a nonvolatile memory which stores, in addition to said number of media, temperatures within a range of used temperatures, and a default gain table storing loop gains of said spindle motor control unit predetermined for each voltage within a range of allowable source voltage; and
wherein said loop gain setting unit reads out a loop gain corresponding to a temperature and a source voltage detected upon activation of the apparatus along with power-on from said default gain table, and sets the loop gain in said spindle motor control unit.

8. The apparatus according to claim 7, wherein, when said loop gain setting unit detects a change in temperature or source voltage over a prescribed value, the loop gain setting unit reads out a loop gain corresponding to temperature or source voltage after change from said default gain table and sets it in said spindle motor control unit.

9. The apparatus according to claim 7, further comprising a loop gain measuring unit which measures loop gain of said spindle motor control unit and adjusts the loop gain to an optimum loop gain;
wherein said loop gain setting unit, upon activation along with the first power-on, reads out a loop gain corresponding to the number of media in the apparatus, temperature and source voltage from said default gain table, and sets the boy gain in said spindle motor control unit; adjusts said spindle motor control unit to an optimum loop gain by means of said loop gain measuring unit; stores said optimum loop gain in the system area of said media; and upon activation along with the second and subsequent power-on, reads out said optimum loop gain from a system area of said media, and sets the loop gain in said spindle motor control unit.

10. The apparatus according to claim 9, wherein said loop gain measuring unit measures a response signal obtained after application of a disturbance signal to an output signal of said spindle motor control unit, and adjusts the loop gain to an optimum value so that said response signal agrees with the disturbance signal.

11. A spindle motor control method of a storage apparatus comprising:
a spindle motor controlling step of servo-controlling a spindle motor so as to keep a medium at constant revolutions;
a loop gain storing step of storing a loop gain of said spindle motor controlling step predetermined for each number of a plurality of numbers of media; and
a loop gain setting step of detecting a number of said media, reading out a loop gain corresponding to the detected number of media from said loop gain storing step, and setting the loop gain for use in said spindle motor controlling step.

12. The method according to claim 11, wherein said loop gain setting step comprises detecting the number of head connections to the head control circuit, and detecting a number of media from the detected number of head connections.

13. The method according to claim 11, wherein said loop gain setting step comprises measuring resistance by supplying sense current while sequentially selecting head connecting terminals of said head controlling circuit, and detecting a number of head connections by determining presence of head connections when the measured resistance is lower than a predetermined value.

14. The method according to claim 11, wherein said loop gain storing step uses a nonvolatile memory which stores a default gain table storing loop gains measured in advance for each of a plurality of numbers of media.

15. The method according to claim 11, further comprising a loop gain measuring step of measuring a loop gain of said spindle motor controlling step; and
wherein said loop gain setting step comprises, upon activation along with the first power-on, reading out a loop gain corresponding to the number of media, setting the loop gain in said spindle motor controlling step, then, adjusting said spindle motor controlling step to meet an optimum loop gain by said loop gain measuring step, and storing said optimum loop gain in a system area of said media, and upon activation along with the second and subsequent power-on, reading out said optimum loop gain from the system area of said media to set it for use in said spindle motor controlling step.

16. The method according to claim 15, wherein said loop gain measuring step comprises measuring the response signal obtained after application of a disturbance signal to an output signal of said spindle motor controlling step and adjusting the loop gain to an optimum value so that said response signal agrees with the disturbance signal.

17. The method according to claim 11;
wherein said loop gain storing step comprises storing, in a nonvolatile memory, in addition to said number of media, a default gain table storing loop gains of said spindle motor controlling step predetermined for each temperature within a range of usage temperatures of the apparatus and for each voltage within an allowable voltage range of source voltage; and
wherein said loop gain setting step comprises reading out a loop gain corresponding to the temperature and the source voltage detected upon activating the device along with power-on from said default gain table and setting the loop gain in said spindle motor controlling step.

18. The method according to claim 17, wherein said loop gain setting step comprises, upon detecting variations in temperature or source voltage over prescribed values during operation of the device, reading out the loop gain corresponding to the temperature or the source voltage after variation from said default gain table and setting them in said spindle motor controlling step.

19. A spindle motor control apparatus which servo-controls a spindle motor so as to maintain a media at certain revolutions, comprising:
a loop gain storing unit which stores a loop gain of said spindle motor control unit predetermined for each of a plurality of numbers of media; and
a loop gain setting unit which detects a number of said media, reads out a loop gain corresponding to the detected number of media from said loop gain storing unit and sends in the loop gain to said spindle motor control apparatus.

20. The apparatus according to claim 19, wherein said loop gain setting unit detects the number of head connections to a head control circuit, and detects number of media from a detected number of head connections.

* * * * *

UNITED STATES PATENT AND TRADEMARK OFFICE
CERTIFICATE OF CORRECTION

PATENT NO. : 7,443,628 B2  
APPLICATION NO. : 11/435190  
DATED : October 28, 2008  
INVENTOR(S) : Hiroshi Oyabu Page 1 of 1

It is certified that error appears in the above-identified patent and that said Letters Patent is hereby corrected as shown below:

<u>In the Claims</u>:

Col. 16, line 9, delete "boy gain" and insert --loop gain--.

Signed and Sealed this

Twenty-fourth Day of March, 2009

JOHN DOLL  
*Acting Director of the United States Patent and Trademark Office*